United States Patent
Catalli et al.

(10) Patent No.: US 11,483,752 B2
(45) Date of Patent: Oct. 25, 2022

(54) ANTENNA KEYHOLE MANAGEMENT IN WIRELESS RADIO COMMUNICATION

(71) Applicant: Fluidmesh Networks S.r.I., Milan (IT)

(72) Inventors: Gaetano Catalli, Florence (IT); Alessandro Erta, Licciana Nardi (IT); Luca Bisti, Grosseto (IT); Umberto Malesci, Milan (IT)

(73) Assignee: FLUIDMESH NETWORKS S.R.I., Milan (IT)

( * ) Notice: Subject to any disclaimer, the term of this patent is extended or adjusted under 35 U.S.C. 154(b) by 139 days.

(21) Appl. No.: 17/109,808

(22) Filed: Dec. 2, 2020

(65) Prior Publication Data
US 2021/0185580 A1    Jun. 17, 2021

(30) Foreign Application Priority Data

Dec. 13, 2019  (EP) .................................... 19216219

(51) Int. Cl.
*H04W 4/00*      (2018.01)
*H04W 36/30*     (2009.01)
(Continued)

(52) U.S. Cl.
CPC ......... *H04W 36/30* (2013.01); *H04W 36/32* (2013.01); *H04W 72/0453* (2013.01); *H04W 76/10* (2018.02)

(58) Field of Classification Search
CPC . H04W 36/30; H04W 36/32; H04W 72/0453; H04W 76/10; H04W 28/02; H04W 36/0061; H04W 36/0083
(Continued)

(56) References Cited

U.S. PATENT DOCUMENTS 8,477,711 B2 * 7/2013 Geiger ................ H04W 72/082
                                                        370/236
8,818,365 B1 * 8/2014 Schlesener ............ H04W 40/36
                                                        455/445
(Continued)

FOREIGN PATENT DOCUMENTS

CN        10188679 A    8/2012
EP         1601136     11/2005
(Continued)

OTHER PUBLICATIONS

Guizzo, Erico, "Network From the Rooftop", online: https://www.technologyreview.com/2003/08/29/234123/networking-from-the-rooftop/, Aug. 2003, 9 pages, MIT Technology Review.
(Continued)

*Primary Examiner* — Amancio Gonzalez
(74) *Attorney, Agent, or Firm* — Behmke Innovation Group LLC; Kenneth J. Heywood; Jonathon P. Western

(57) ABSTRACT

In one embodiment, a mobile radio station in communication with a current base station of a plurality of base stations receives hello packets from one or more of the base stations. The hello packets from the current base station are received on a first frequency via a first mobile radio unit (M1) and the hello packets from one or more base stations are received on a second frequency via a second mobile radio unit (M2). When the signal strength value of the current base station exceeds a threshold value, the mobile radio station: selects a destination from the plurality of base stations based on the destination having a highest signal strength value among those in the plurality of base stations that sent hello packets to M2 on the second frequency, and forces a handoff from M1 to M2, by establishing a new link between M2 and the destination base station.

20 Claims, 11 Drawing Sheets

(51) Int. Cl.
*H04W 76/10* (2018.01)
*H04W 36/32* (2009.01)
*H04W 72/04* (2009.01)

(58) Field of Classification Search
USPC .......................................................... 370/331
See application file for complete search history.

(56) References Cited

U.S. PATENT DOCUMENTS

| | | | | |
|---|---|---|---|---|
| 10,057,776 | B2* | 8/2018 | Kaushik | H04W 12/12 |
| 10,893,416 | B2* | 1/2021 | Gresset | B61L 27/40 |
| 11,012,346 | B2* | 5/2021 | Achouri | H04W 4/42 |
| 11,032,782 | B2* | 6/2021 | Gresset | G06F 17/142 |
| 11,304,110 | B2* | 4/2022 | Catalli | H04W 36/00835 |
| 2005/0059387 | A1* | 3/2005 | Lardennois | H04W 16/02 455/445 |
| 2007/0232278 | A1* | 10/2007 | May | H04M 1/72451 455/566 |
| 2021/0070335 | A1* | 3/2021 | Bjurström | B61L 27/30 |
| 2021/0266764 | A1* | 8/2021 | Khanfouci | H04W 4/24 |
| 2021/0297341 | A1* | 9/2021 | Achouri | H04W 4/44 |

FOREIGN PATENT DOCUMENTS

| | | |
|---|---|---|
| EP | 2840836 | 2/2015 |
| JP | 2008288820 A | 11/2008 |
| WO | 2003107704 | 12/2003 |

OTHER PUBLICATIONS

Moreno, et al., "Keyhole Estimation of an MIMO-OFDM Train-to-Wayside Communication System on Subway on Subway Tunnels", IEEE Antennas and Wireless Propagation Letters, vol. 14, Jan. 2015, p. 88-91, IEEE.

Chizhik, et al., "Keyholes, Correlations, and Capacities of Multielement Transmit and Receive Antennas", IEEE Transactions on Wireless Communications, vol. 1, No. 2, Apr. 2002, pp. 361-368, IEEE.

Zhou, et al., "Evaluation of Cascaded Multi-Keyhole Channels in Cooperative Diversity Wireless Communications", IEICE Trans. Commun., vol. E96-B, Jan. 2013, pp. 223-232, The Institute of Electronics, Information and Communication Engineers.

* cited by examiner

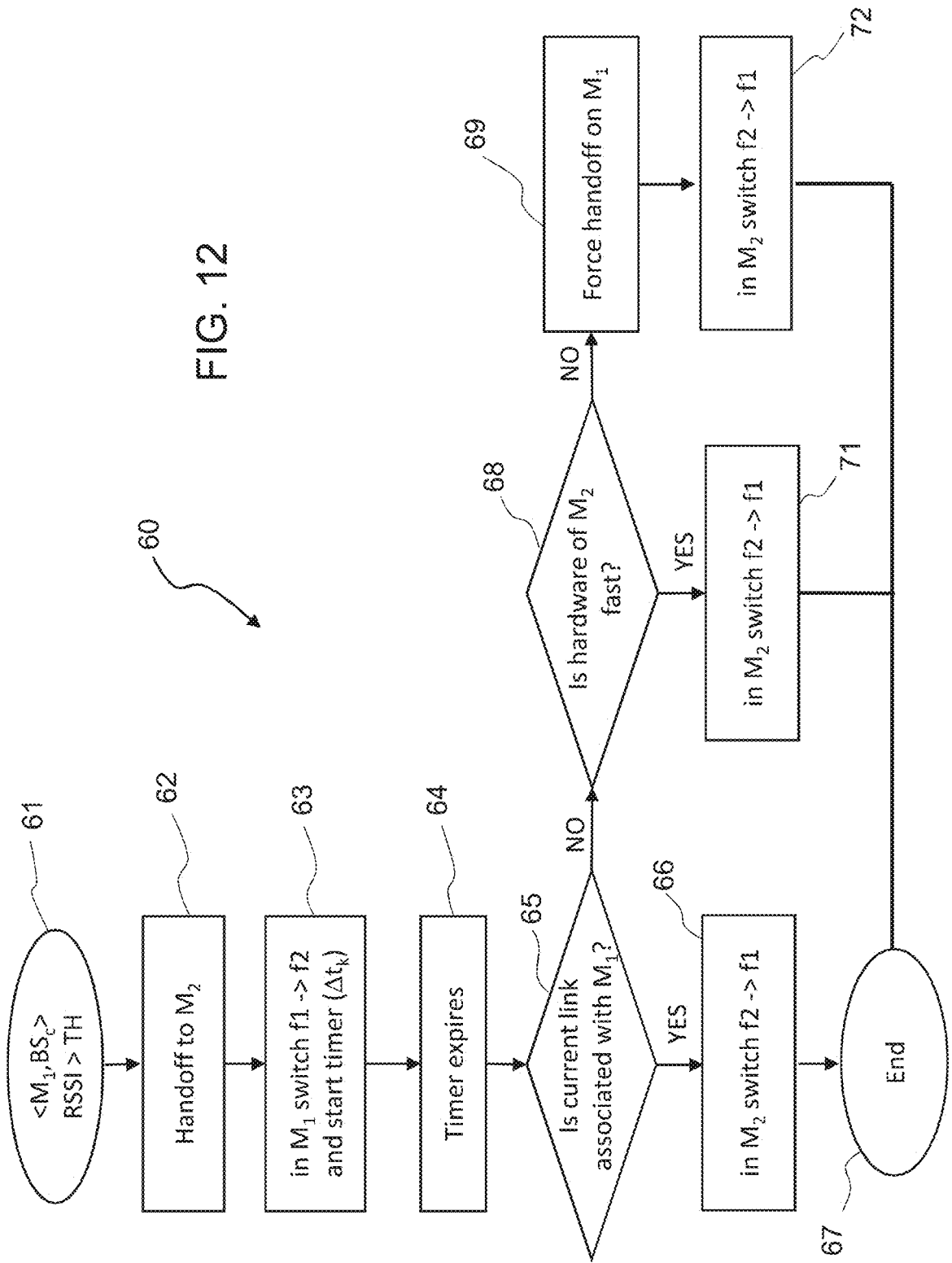

ial diagram of the train-to-
ANTENNA KEYHOLE MANAGEMENT IN WIRELESS RADIO COMMUNICATION

RELATED APPLICATION

This application is claims priority to EP Appl. No. 19216219, filed Dec. 13, 2019, entitled ANTENNA KEYHOLE MANAGEMENT IN WIRELESS RADIO COMMUNICATION, by Gaetano Catalli et al., the contents of which are incorporated herein by reference.

TECHNICAL FIELD

The present disclosure relates generally to wireless radio communication and, more particularly, to antenna keyhole management in wireless radio communications.

BACKGROUND

Cellular network coverage has made Internet connectivity increasingly ubiquitous. This has led to an ever-increasing demand for bandwidth, to accommodate traffic such as multimedia content and communications (e.g., bandwidth-intensive high definition video streaming or real time video calls, etc.). For instance, passengers of public transportation now expect on-board, high-speed connectivity, which implies a reliable wireless ground-to-vehicle communication.

The propagation of radio waves in tunnels employing multiple-input, multiple-output (MIMO) communications may suffer from the appearance of keyholes. In general, a "keyhole" refers to a phenomenon in MIMO telecommunication channels for which the propagation of multipath signals from the transmitter side to the receiver side is mostly hindered except for a narrow area between two sides. In other words, a keyhole happens when the channel transfer matrix has a low spatial correlation and a low rank. The occurrence of a keyhole leads to a severe degradation of the MIMO performance even when transmitter and receiver antennas are uncorrelated, and the MIMO channel capacity may be reduced to that of single-input, single-output (SISO) communication.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 12 is an example flow chart depicting an example of a handoff procedure consistent with an embodiment of the present disclosure.

DESCRIPTION OF EXAMPLE EMBODIMENTS

Overview

Figure 1:
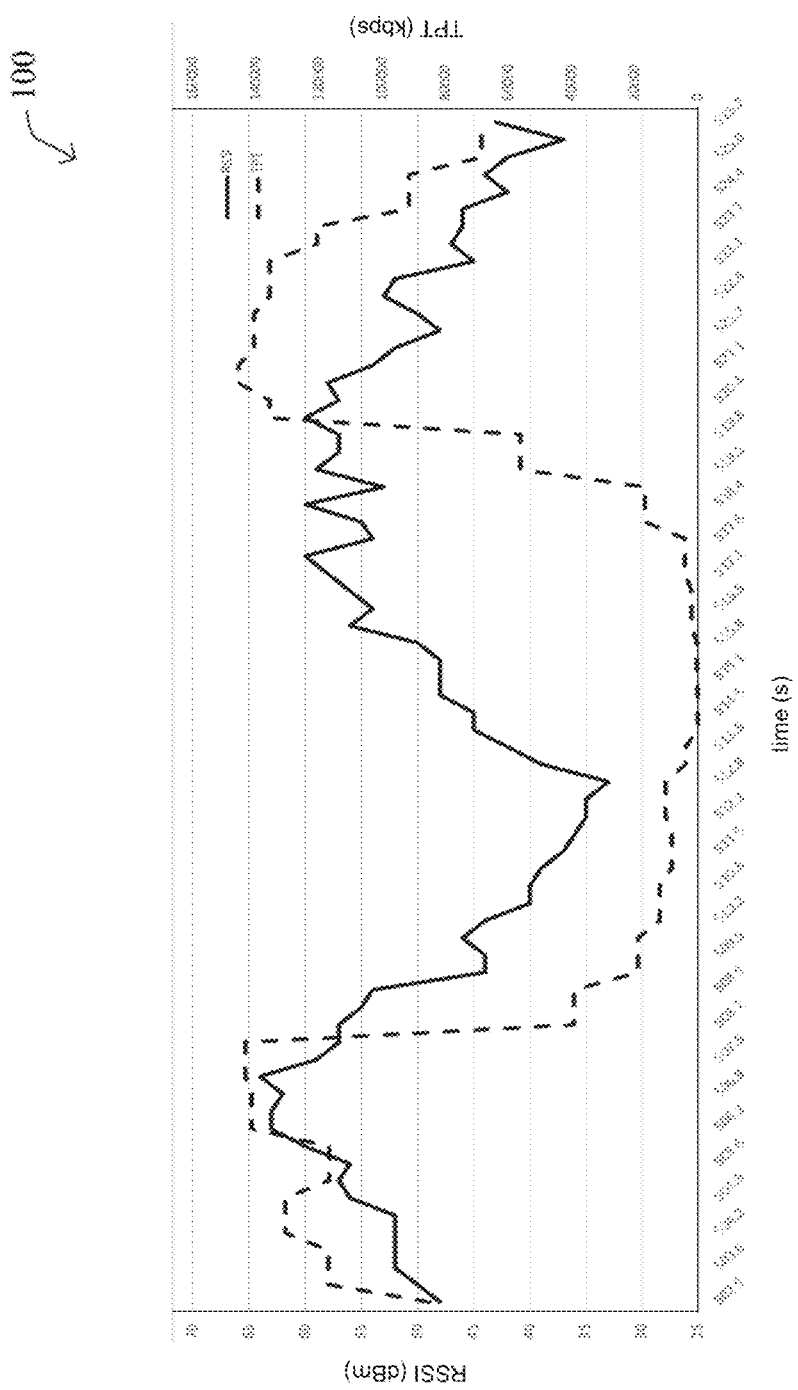
FIG. 1 is an example graph reporting the received signal strength indicator (RSSI) of the current link resulting from the application of a handoff algorithm.

In one embodiment, a mobile radio station in communication with a current base station of a plurality of base stations receives hello packets from one or more base stations in the plurality of base stations. The mobile radio station receives hello packets from the current base station on a first frequency via a first mobile radio unit and hello packets from one or more base stations in the plurality of base stations on a second frequency via a second mobile radio unit. The mobile radio station determines, based on the hello packets, signal strength values associated with each of the plurality of base stations. When the current base station is associated with a signal strength value that exceeds a threshold value, the mobile radio station selects a first destination base station from the plurality of base stations based on the first destination base station having a highest signal strength value among those base stations in the plurality of base stations that sent hello packets to the second mobile radio unit on the second frequency. When the threshold value is exceeded, the mobile radio station also forces a handoff from the first mobile radio unit to the second mobile radio unit, in part by establishing a new radio communication link between the second mobile radio unit and the first destination base station.

DESCRIPTION

The present disclosure will be now described more fully hereinafter with reference to the accompanying drawings, in which some, but not all embodiments of the invention are shown. Drawings illustrating the embodiments are not-to-scale schematic representations.

For the purpose of the present description and of the appended claims, except where otherwise indicated, all numbers expressing amounts, quantities, percentages, and so forth, are to be understood as being modified in all instances by the term "about." Also, all ranges include the maximum and minimum points disclosed and include any intermediate ranges therein, which may or may not be specifically enumerated herein.

As noted above, public transportation systems are increasingly providing high-speed data connections to their passengers. In addition to this, Intelligent Transportation Systems (ITS) are also emerging, which requires a new generation of services for control, automation, and monitoring. Consequently, the implementation of real-time video surveillance for remote surveillance of trains and the installation of a large number of sensors and actuators for remote diagnostic and telemetry will demand for broadband connectivity that can ensure reliability, customizable Quality of Service (QoS) and high bandwidth.

Wireless communication in high-speed vehicular mobility scenarios pose complex technical challenges across several layers of the ISO-OSI stack, including the physical layer and the Medium Access Control (MAC) layer. The physical layer specifies the actual modulation/demodulation technique used to transmit packets over the air. Distortion effects like the Doppler effect may negatively impact the performance of the physical layer. Modern modulation techniques like Orthogonal Frequency Division Multiplexing (OFDM) can reduce the impact of distortive phenomena on the channel and, thus, allow obtaining good transmission performance even in high-speed vehicular communication scenarios. Multiple-input multiple-output (MIMO) wireless communication systems, which employ multi-element antenna arrays at both the transmitter and the receiver side, has proved to be an effective technology to provide large bandwidth in harsh environments, such as railways tunnels, especially when combined with OFDM.

Typically, railway communications deploy a wireless local area network (WLAN), such as Wi-Fi or WiMAX, within the train so that passengers are connected to the Internet via a Wi-Fi connection. A Wi-Fi standard rely on a MIMO-OFDM physical layer operating at 5 GHz or 2.4 GHz, which provides good throughput performance at several miles distance using fairly directive antennas on the trackside. Wi-Fi technology can be based on standards IEEE 802.11.

Recently, 3GPP LTE (Long Term Evolution) and LTE-A (LTE-Advanced) have been proposed as standards for railway communications. A key feature in LTE and LTE-A is the MIMO technology. In particular, LTE-A can support up to 8×8 antennas in the downlink and 4×4 antennas in the uplink.

Proprietary solutions for providing on board Internet access in trains have also been developed. For instance, FLUIDITY™ is a transmission protocol that is a license-free trackside wireless protocol operating in the 5 GHz band. The system relies on a 2×2 MIMO-based radio technology and dual-polarized trackside and on-board antennas.

The propagation of radio waves in tunnels employing the MIMO technology may suffer from the appearance of keyholes. The term "keyhole" refers to a phenomenon, particularly present in MIMO telecommunication channels, in which the propagation of multipath signals from the transmitter side to the receiver side is mostly hindered except for a narrow area between two sides. In other words, a keyhole happens when the channel transfer matrix has a low spatial correlation and a low rank. The occurrence of a keyhole leads to a severe degradation of the MIMO performance even when transmitter and receiver antennas are uncorrelated, and the MIMO channel capacity may be reduced to that of SISO (single-input single-output) communication.

In order to ensure a continuous connection, base stations, generally referred also to as "wireless access points" (APs), are appropriately deployed along the railway. The train-to-wayside wireless communication can rely on existing network infrastructure, such as that of public cellular networks, or on a specific, dedicated network infrastructure.

The techniques introduce herein address the problem of keyholes in wireless radio communication between an on-board radio station in a vehicle traveling along a pathway and a plurality of fixed wayside radio stations arranged along the pathway. In the following description and claims, the fixed radio stations arranged along the pathway are referred to as "radio base stations" or "base stations" or "wayside (radio) base stations."

Radio signals transmitted from a base station may be fed through cables to one or more antennas and then launched as radio waves into an area around the base station. Generally speaking, the area for which the base station is designed to provide coverage, indicated in the following as 'radio coverage area' or 'coverage area', mainly depends on the power of the transmitter of the base station and on the radiation patterns of the antennas. The plurality of wayside base stations is typically arranged along the pathway in such a way that the radio coverage area of near adjacent base stations partially overlap one another at least in the direction of the pathway, resulting in a coverage redundancy in the travelling direction of the moving vehicle.

As the on-board radio station travels, it receives radio signals that vary in strength from the neighbor base stations and handoff processes are typically needed to keep a wireless connection active.

A handoff scheme of the type which selects a base station having the best communication condition among neighbor base stations, in most cases, would not solve a massive fall in data transfer rate at the keyhole. A key observation herein is that the keyhole effect generally occurs approximately at the location of the wayside antenna(s), generally corresponding to the location of the mast of each base station, where the transmitted signal is at or close to the peak values.

In some embodiments, the keyhole effects at the proximity of a base station can be considerably reduced by forcing the radio unit to disconnect from that base station when the received signal strength is above a threshold signal strength value and by establishing a connection with a base station which is deemed not to be affected by the keyhole effect. In particular, the Applicant has understood that the keyhole effects at the proximity of a base station in communication link with a radio unit of the on-board radio station can be considerably reduced.

A moving radio station comprising a first mobile radio unit and a second mobile radio unit has been considered, wherein the first mobile radio unit and the second mobile radio unit are located spatially separated in a travelling direction, in particular the antennas of the first and the second mobile radio unit are located spatially separated in the travelling direction.

The Applicant has understood by employing an arrangement of wayside base stations where near adjacent base stations transmit at different radio frequencies selected from a first and a second frequency and the first and second mobile radio units of the moving radio station are set to receive at either of these frequencies, the keyhole effect can be avoided with none or minimal service disruption by performing a handoff from a radio unit set at one of the first and second frequencies and connected with a current base station affected by the keyhole to the other radio unit that receives signals on the other of the first and second frequencies from a base station, the other radio unit being deemed not to be affected by the keyhole.

In general, 'near adjacent base stations' refers to base stations of the plurality of base stations that are immediately adjacent to one another along the pathway. For example, one base station of two near adjacent base stations may be immediately preceding or immediately subsequent to the other base station. Typically, the second radio unit is located behind the first radio unit in the travelling direction, the first radio unit being the first to approach a base station. By performing a handoff from the first radio unit to the second radio unit that is in communication with neighbor base stations excluding the current base station, a temporary connection with a neighbor base station not affected by the keyhole effect may be established.

The destination base station is often but not necessarily the preceding base station arranged near adjacent to the disconnected base station, in relation with the travelling direction of the moving radio station. The destination base station may have a lower signal strength than that of the current base station, at the time of the handoff. Nonetheless, one observation herein is that the adverse effects in data transfer rate from/to the on-board radio unit at the keyhole are avoided or at least mitigated.

In the following description and claims, the moving radio station, typically an on-board radio station, is referred to as mobile or moving radio station and the antenna(s) of the mobile radio station to as mobile or moving antennas.

In some embodiments, a method for managing radio communication is introduced that is particularly well suited for handing off wireless radio communication between a plurality of fixed wayside radio base stations arranged spatially separated along a pathway and a mobile radio station moving in a travelling direction along the pathway. The mobile radio station may comprise a first mobile radio unit (or "first radio unit") and a second mobile radio unit (or "second radio unit") arranged spatially separated from one another, along the pathway. Typically, each of the first and second mobile radio units is configured to send and receive radio frequency (RF) signals and in particular RF packets. Each wayside base station of the plurality of base stations may also be configured to send and receive radio frequency (RF) signals and, in particular, RF packets.

In further embodiments, a method is described herein for managing a radio communication link between a mobile radio station and a plurality of fixed wayside base stations arranged spatially separated along a pathway, the mobile radio station moving in a travelling direction along the pathway with respect to the base stations. Each of the base stations is set to operate at a respective radio frequency selected from a first frequency and a second frequency and the base stations are arranged in a way that near adjacent base stations are set at alternating frequencies. The mobile radio station may also comprise a first mobile radio unit and a second mobile radio unit spatially separated in the travelling direction, each of the first and second mobile radio unit being configured to receive radio signals at one of the first and second frequencies. The method may also comprise periodically transmitting hello packets to the mobile radio station, in each base station of the plurality of base stations, each hello packet including a base station identifier univocally identifying the base station transmitting the hello packet. The method may further comprise receiving hello packets from one or more neighbor base stations set at the first frequency, in the first mobile radio unit set at the first frequency and in a current radio communication link with a current base station set at the first frequency, the neighbor base stations including the current base station and being comprised in the plurality of base stations. The method may additionally include, in the second mobile radio unit set at the second frequency, receiving hello packets from one or more neighbor base stations set at the second frequency and comprised in the plurality of base stations. The method may also include determining, in the mobile radio station, respective signal strength values for the hello packets received from the first mobile radio unit and the second mobile radio unit and store the determined signal strength values, each signal strength value being stored in association with a respective base station identifier and a respective radio unit identifier. The method may further include repeatedly analyzing the stored signal strength values associated with the current base station and the first radio unit, to determine whether the signal strength values are larger than a threshold signal strength value. If a signal strength value associated with the current base station is determined to be larger than the threshold signal strength value, the method may proceed with analyzing the stored signal strength values associated with the second radio unit to select a neighbor base station associated with the highest signal strength value as first destination base station set at second frequency, and forcing a handoff from the first mobile radio unit to the second mobile radio unit and establishing a new radio communication link between the second radio unit and the first destination base station.

Upon handoff from the first radio mobile unit to the second mobile radio unit connected to the destination base station, the destination base station becomes the current base station for the mobile radio station, in some embodiments. In further embodiments, the threshold signal strength value is a predetermined signal strength value, preferably. The handoff from first mobile radio unit to the second mobile radio unit may also preferably trigger a frequency switch at the first mobile radio unit. In another embodiment, upon handoff to the first destination base station, the method may also comprise starting in the first radio unit a frequency switching operation to switch the first frequency to the second frequency so that, at the end of the frequency switching operation, the first radio unit is configured to receive hello packets from one or more neighbor base stations set at the second frequency.

In some embodiments, upon handoff from the first mobile radio unit to the second mobile radio unit, the method preferably comprises setting a timer starting a keyhole time duration and, in the second mobile radio unit set at the second frequency and in a current radio communication link with the first destination base station as current base station and in the first radio unit set at the second frequency, receiving hello packets from one or more neighbor base stations set at the second frequency, the neighbor base stations including the first destination base station.

In another embodiment, the keyhole time duration $\Delta t_k$ is a predetermined time value, preferably. In one embodiment, the setting of the timer starting the keyhole time duration and the frequency switching operation in the first mobile radio unit may take place simultaneously upon handoff from the first radio unit to the second radio unit.

In some embodiments, during the keyhole time duration, the method may further comprise analyzing the stored signal strength values associated with the hello packets received by the first mobile radio unit and by the second mobile radio unit to determine a highest signal strength value, and if the determined highest signal strength value is associated with a second destination base station other than the first destination base station, forcing a handoff from the first destination base station to the second destination base station. If the mobile radio unit associated with the second destination base station is the first mobile radio unit, the handoff may comprise a handoff from the second mobile radio unit to the first mobile radio unit, so that, upon handoff, a new radio communication link is established between either the first mobile radio unit or the second mobile radio unit and the second destination base station.

In another embodiment, if, during the keyhole time duration, the highest signal strength value is associated with the first destination base station, the method comprises maintaining the radio communication link with the first destination base station as current base station, preferably. In yet another embodiment, analyzing the stored signal strength values associated with the hello packets received by the first mobile radio unit and by the mobile second radio unit set at the second frequency is iteratively repeated during the keyhole time duration, preferably.

In another embodiment, during the keyhole time duration, the method comprises maintaining the current communication link between the second mobile radio unit and the first destination base station until the timer expires.

The option as to whether to search for the best signal during the keyhole time duration and allow possible handoffs between mobile radio units and/or base stations or to maintain the current radio communication link until lapse of the keyhole time duration may also take into account some characteristics of the wireless network infrastructure.

As the frequency switching operation in the first mobile radio unit is typically carried out when the current radio communication link may be established with the second mobile radio unit following to the forced handoff, in many practical cases, the time required for the switching operation in the first mobile radio unit is not relevant. Typically, the handoff to the second mobile radio unit cut off the radio communication link with a current base station above threshold and allows to perform the frequency shift in the first radio mobile radio without causing a service disruption.

An observation herein is that, upon lapse of the keyhole time duration, namely when the first radio mobile unit is expected to have passed the keyhole, a temporary service disruption may occur due to switching delays caused by the frequency switching operation in the second mobile radio unit. These switching delays are typically largely due to hardware equipment and may be non-negligible. The time required to set a mobile radio unit to a different radio frequency may widely vary, such as from less than 1 millisecond (ms) to more than 400 ms.

A further observation herein is that, depending on the radio hardware of the mobile radio station, the time to carry out the switching operation may be divided in two ranges, a "fast switching" and a "slow switching." The fast switching may include frequency switch operations that take less than 2-4 ms, whereas the slow switching may include frequency switch operations that take more than 5 ms, in particular more than 10 ms. Upon lapse of the keyhole time duration, the current radio communication link may be with the first mobile radio unit or with the second mobile radio unit.

If, upon lapse of the keyhole time duration, a current radio communication link is established with the first mobile radio unit and/or the second mobile radio unit allows a fast switching, a frequency switching operation in the second mobile radio unit from the second frequency to the first frequency may be typically executed without significant service disruption.

In some embodiments, the method also comprises, upon lapse of the keyhole time duration, starting a frequency switching operation in the second radio unit from the second frequency to the first frequency so that, at the end of the frequency switching operation, the second radio unit is configured to receive hello packets from one or more neighbor base stations operating at the first frequency.

A further observation herein is that, in case the second mobile radio unit is configured to carry out a frequency switching operation defined as "slow switching," it is preferred to force a handoff from the second mobile radio unit to the first mobile radio unit so as to avoid or minimize service disruption during the switching operation in the second mobile radio unit.

In some embodiments, upon lapse of the keyhole time duration, the method may comprise determining if the current radio communication link is associated with the first mobile radio unit or with the second mobile radio unit, if the current radio communication link is determined to be associated with the second radio unit at the end of the keyhole duration, analyzing the stored signal strength values associated with the first mobile radio unit set at the second frequency to select a neighbor base station associated with the highest signal strength value as a temporary base station, forcing a handoff from the second radio unit to the first radio unit and establishing a new radio communication link between the first mobile radio unit and the temporary base station, and upon handoff to first radio unit, starting a frequency switching operation in the second radio unit from the second frequency to the first frequency so that, at the end of the frequency switching operation, the second radio unit is configured to receive hello packets from one or more neighbor base stations operating at the first frequency.

Preferably, in some embodiments, if, upon lapse of the keyhole time duration, the current radio communication link is determined to be associated with the first mobile radio unit, the method comprises starting a frequency switching operation in the second radio unit from said second frequency to said first frequency so that, at the end of the frequency switching operation, the second radio unit is configured to receive hello packets from neighbor base stations operating at the first frequency.

At the end of the frequency switching operation in the second mobile radio unit, the first and the second radio unit are (again) at different frequencies, in some embodiments. Frequencies may be inverted with respect to the initial situation: the first mobile radio unit is set at the second frequency, while the second mobile radio unit is set the first frequency. Frequency inversion between two mobile radio units takes place each time the procedure triggered by the crossing of the threshold signal strength value is executed and completed.

Preferably, in some embodiments, the method also comprises, at the end of the frequency switching operation in the second radio unit from the second frequency to the first frequency and the first radio unit being set at the second frequency and a current radio communication link being established between either of the first and the second mobile radio unit and a current base station, analyzing the stored signal strength values associated with hello packets received by the first mobile radio unit and the second mobile radio unit to determine a highest signal strength value and if the highest signal strength value is associated with a base station other than the current base station, forcing a handoff to the base station associated with the highest signal strength value, thereby establishing a new radio communication link between either the first radio unit or the second radio unit and that base station.

In some embodiments, after establishing a new radio communication link between either the first radio unit or the second radio unit and a current base station, typically after the frequency switch in the second mobile radio unit, the method also comprises repeating operations in its second through sixth steps, where the first mobile radio unit in the second step is configured to receive hello packets at the second frequency and the second is configured to receive hello packets at the first frequency, in the third step.

Storing the signal strength values in association with respective base station identifiers and mobile radio unit identifiers may comprise storing the signal strength values in a neighbor table as table entries. The neighbor table may also be stored in a memory space. In some cases, the neighbor table may be a dynamic read table automatically updated when a new hello packet is received by either mobile radio unit of the mobile radio station.

Preferably, at the end of the frequency switching operation in the first mobile radio unit from the first frequency to the second frequency, after establishing a new radio communication link between the second mobile radio unit and the first destination base station, the method may comprise removing from the neighbor table all entries associated with the first mobile radio unit.

In another embodiment, preferably, at the end of the frequency switching operation in the second mobile radio unit from the second frequency to the first frequency, the method comprises removing from the neighbor table all entries associated with the second mobile radio unit. This eliminates from the neighbor table the entries associated with base stations operating at a different frequency from that at which the first or the second mobile radio unit is set after the frequency switch triggered by the signal strength threshold crossing and/or the lapse of the keyhole time duration (e.g., expiration of a timer set for the keyhole time duration). As the mobile radio station moves, the entries associated to base stations in communication with the mobile radio unit before the frequency shift are "old" entries and unlikely potential handoff candidates.

In one embodiment, if the result of repeatedly analyzing the stored signal strength values to determine if a signal strength value associated with the current base station and the first mobile radio unit (e.g., the fifth step of the method), is that the signal strength value is not above the threshold signal strength value, the current communication link with the current base station is maintained, preferably.

In another embodiment, the method preferably comprises, if the signal strength value of the current base station is determined to be smaller than or equal to the threshold signal strength value, analyzing the stored signal strength values associated with the first mobile radio unit and with the second mobile radio unit to determine a highest signal strength value and, if the highest signal strength value is associated with a neighbor base station other than the current base station, forcing a handoff to the neighbor base station as the new current base station, and, if that neighbor base station having the highest signal strength value is associated with the second mobile radio unit, the handoff comprises a handoff from the first radio unit to the second mobile radio unit.

In yet a further embodiment, before executing the handoff procedure at the keyhole occurrences, the method is preferably aware that the first mobile radio unit is the head radio unit in the travelling direction, in practice the mobile radio unit placed at a front part of the vehicle relative to the travelling direction. The mobile radio station may receive this information from an external source, for example as input data into the electronic processor of the mobile radio station mastering the handoff process or as a GPS signal received by the mobile radio units. One observation herein is that these options may not always be available. Preferably, the method of managing a radio communication link comprises an automatic detection of the head radio unit between the first and second radio units, in the following indicated also with "head detection."

In yet another embodiment, the method comprises setting the first and the second mobile radio unit at the same initial frequency selected from the first and second frequency so that each mobile radio unit is configured to receive radio signals only from base stations of the plurality of base stations transmitting at that initial frequency; in the first and second radio units receiving hello packets at the initial frequency, wherein one of the first and second radio unit is in a current radio communication link with a current base station; determining respective signal strength values for the hello packets received from the first radio unit and the second radio unit and store the determined signal strength values, each signal strength value being stored in association with a respective base station identifier and a respective radio unit identifier of the mobile radio unit; repeatedly analyzing the stored signal strength values to determine the highest signal strength value and, if the highest signal strength value is associated with a base station other than the current base station, forcing a handoff to that base station, thereby establishing a new radio communication link between either the first radio unit or the second radio unit; analyzing the stored signal strength values associated with the current base station to determine whether the signal strength values are larger than a threshold signal strength value; each time that a signal strength value associated with a current base station is determined to be larger than the threshold signal strength value, store a respective trigger event in association with the radio unit identifier of the mobile radio unit in radio communication link with the current base station, and determining a number of trigger events stored in association with each mobile radio unit and, if two consecutive trigger events are determined to be associated with the same radio unit, determining that that mobile radio unit is the head radio unit positioned at the front part of the moving vehicle.

At the end of the head detection procedure, the first and the second mobile radio units may be set at the same frequency and thus receive hello packets at the same frequency. Upon determination that the first mobile radio unit is the head radio unit, the method may comprise establishing a radio communication link with either mobile radio unit and a current base station and executing the second through sixth steps of the method, as described above except for that the first mobile radio unit and the second mobile radio unit are set at the same frequency. However, once a signal strength value associated with the current base station is determined to be larger than the threshold strength value, the handoff from a mobile radio unit (typically the head radio unit) to other mobile radio unit triggers a frequency switch in the disconnected mobile radio unit. Once the frequency switch is executed, the first and second mobile radio unit are set at different frequencies and the handoff procedure may iteratively take place as describe above.

Typically, for the base stations to operate at two different alternating frequencies, two different radio frequency channels may be assigned to the plurality of base stations in a way that near adjacent (e.g., immediately subsequent or preceding) base stations operate at different channels. The different channels have separate frequencies, typically separate frequency bandwidths. The first and second frequencies may be the central frequency of a respective frequency band defining the channel bandwidth or any other frequency within the channel bandwidth. The sequence of base stations of the plurality of base stations as seen by the moving radio station is a deployment of base stations set at alternating frequencies (channels) so that near adjacent base stations operate at different frequencies.

At a certain instant of time, in particular at any instant of time, a single radio communication link may be established between a mobile radio unit of the mobile radio station and one wayside base station of the plurality of base stations, indicated as current base station. Each of the wayside base stations may define a radio coverage area of radio communication such as the coverage area of near adjacent, e.g., consecutive when viewed in the travelling direction, base stations partially overlap one another along the pathway, resulting in a coverage redundancy.

The distance between base stations may be constant or variable in the base station deployment along the pathway. For instance, the pathway may be a line or a curved track. The hello packets may also be transmitted via a radio frequency (RF) communication connection.

Each base station may be configured to periodically transmit hello packets including a unique identifier associated to the base station. The periodical transmission of hello packets may take place in a frame of unsolicited data packet broadcast, according to known standards in wireless communication, for example in Wi-Fi standards IEEE 802.11. For example, the radio frequency channel is comprised within the 5 GHz band or the 2.4 GHz band.

In the present description and claims, the expression "hello packet" is generally meant to indicate a basic unit of radio communication that travels over the wireless network and contains information related to identification of the base station and possibly other parameters such as information on network status. Hello packets periodically emitted from a wayside base station may be beacon frames, although this is a non-limitative implementation. Typically, a beacon frame includes a header, a payload and a frame check sequence. The unique identifier for the base station is often included in the header while the payload contains time and capability information. Wireless examples of hello packets can be also those used by the mesh network Roofnet developed by Massachusetts Institute of Technology (M.I.T.). Preferably, the wireless network defined by the plurality of base stations is a digital communications network.

In further embodiments, the present disclosure also introduces a mobile radio station comprising a first mobile radio unit and a second mobile radio unit, each of the first and second mobile radio unit comprising a respective first and second mobile receiver configured to receive radio signals at one radio frequency selected from a first frequency ($f_1$) and a second frequency ($f_2$) from a plurality of fixed wayside base stations arranged spatially separated along a pathway, wherein each base station is set to operate at the first frequency ($f_1$) or at the second frequency ($f_2$) and is configured to periodically transmit hello packets at one of the first and second frequencies, each hello packet including a respective base station identifier and the base stations being arranged in a way that near adjacent base stations are set at alternating frequencies. The mobile radio station also includes an electronic processor operatively connected to the first and the second mobile receiver of the respective mobile radio unit and programmed to: receive hello packets from the first and second mobile receiver, determining respective signal strength values for the hello packets received and store the determined signal strength values, each signal strength value being stored in association with a respective base station identifier and a respective radio unit identifier identifying the mobile radio unit; establish a radio communication link between the first radio unit set at the first frequency and a current base station; repeatedly analyze the stored signal strength values associated with the current base station and the first mobile radio unit to determine whether the signal strength values are larger than a threshold signal strength value; if a signal strength value associated with the current base station ($BS_c$) is determined to be larger than the threshold signal strength value (TH), analyze the stored signal strength values associated with the second radio unit set at the second frequency to select a neighbor base station set at second frequency and associated with the highest signal strength value as first destination base station, and force a handoff from the first radio unit to the second radio unit and establishing a new radio communication link between the second radio unit and the first destination base station.

Preferably, the mobile radio station is arranged in, in particular mounted on, a moving vehicle travelling in the travelling direction along the pathway.

In some embodiments, the first mobile radio unit is connected with a first mobile antenna and the second mobile radio unit is connected with a second mobile antenna, wherein the first and the second mobile antennas are located on the moving vehicle. Preferably, the first and the second mobile antennas are spatially separated from one another in the travelling direction. Preferably, the second mobile antenna is located behind the first mobile antenna in the travelling direction. The first mobile radio unit may be mounted on a front part of the moving vehicle with reference to the travelling direction while the second mobile radio unit may be mounted on a rear part of the moving vehicle. Preferably, the first mobile radio unit is a head radio unit positioned on the front part of the moving vehicle and being connected with the first mobile antenna positioned on the front part. Preferably, the second mobile radio unit is a tail radio unit positioned on the rear part of the moving vehicle and being connected with the second mobile antenna positioned on the rear part. Typically, the moving vehicle has a length in the travelling direction and the first and the second mobile antennas are placed at a distance from one another taken along the length of the vehicle.

It is to be understood that the terms "front" or "head" and "rear" or "tail" depend on the moving direction and are defined relative to the moving direction. The moving vehicle may be a train, for example a high-speed train or a subway train. The length of a train may of course widely vary and so may the distance between the head radio unit and the tail radio unit. As the vehicle moves along the pathway of the deployment of the wayside base stations, the distance between head and the tail radio unit may take into account the average distance between near adjacent wayside base stations or the deployment of base stations may take into account the configuration of the mobile radio station installed in the vehicle.

In particular, each mobile radio unit may comprise a respective mobile receiver and a mobile transmitter (e.g., a transceiver). The mobile radio station may be operatively connected to an on-board communication network system, such as a wireless communication system, for signal distribution and/or access. The electronic processor may be programmed to store signal strength values in a memory space. The electronic processor may also be programmed to store signal strength values in a memory space as table entries in a neighbor table.

Preferably, the electronic processor is operatively connected to the mobile receiver of the first mobile radio unit and to the mobile receiver of the second mobile radio unit, possibly through a second electronic processor connected to the second mobile radio unit, and is programmed to receive signal strength values associated with respective base station identifiers and radio unit identifiers received from both the first and the second mobile radio unit.

Preferably, a respective first and second electronic processor are operatively connected with the first mobile receiver of the mobile radio unit and to the second mobile receiver of the mobile radio unit.

Preferably, one of the first and second electronic processors is selected as a master processor configured to store the signal strength values in association with respective base station identifiers and mobile radio unit identifiers from both mobile radio units and execute the iterative analysis of the stored signal strength values to select a base station for the handoff from a current base station, in accordance with the present disclosure. The other electronic processor may be configured as a slave processor in a master-slave configuration, the slave processor being programmed to determine the signal strength values of the hello packets received from the receiver of the relevant mobile radio unit and transmit said signal strength values associated with respective mobile radio unit and base station identifiers to the master processor.

Preferably, each mobile antenna is operatively coupled to the transmitter and receiver of the respective mobile radio unit. Preferably, the first and second mobile antennas are also designed to create a directional radiation pattern.

Within the present description and claims and according to the customary use of the terms, with "directional antenna" or "directive antenna" it is meant an RF wireless antenna having a directional radiation pattern of a waves radiated from the antenna of relatively narrow angular width, for example of angular width of from few degrees to few tens of degrees.

Directional antennas that may be suitable in implementations of the present disclosure may have a directional radiation pattern with a main lobe, which exhibits the higher field strength within a relatively narrow angular width, and minor lobes of lower field strength, the minor lobes including a back lobe in the opposite direction (180°) from the main lobe and typically major of the minor lobes.

Preferably, the first and second mobile antennas are mounted on the vehicle in such a way that their radiation patterns point two opposite directions, one of the two directional radiation patterns pointing the travelling direction of the vehicle.

Preferably, the first mobile antenna connected to the first mobile radio unit has a radiation pattern pointing the travelling direction and the second mobile antenna connected with the second mobile radio unit has a radiation pattern pointing a direction opposite to the travelling direction.

Although omni-directional antennas are not excluded from the scope of the present invention, currently available directive antennas are in most cases preferred as they typically exhibit higher gain, hence they can be used to reduce the density of the base stations along the track with advantages in terms of deployment costs.

The mobile radio station may be mounted on a moving train and the pathway may be a rail track. Although embodiments in the more detailed description refer in particular to trains running on a rail track as a pathway, the disclosed solution can be generally applied in vehicle-to-ground systems where the vehicle may be a train, a car or a bus moving along a pathway, such as a rail track or a road line. A further example of vehicle is a ferry-boat sailing around a lake or along a section of the sea/lake coast, wherein a plurality of wayside fixed base stations are deployed along the coastline. As would be appreciated, the vehicle may also comprise an unmanned and/or autonomous vehicle, such as a drone, cargo vehicle, or the like.

The present disclosure will be now described more fully hereinafter with reference to the accompanying drawings, in which some, but not all embodiments of the invention are shown. Drawings illustrating the embodiments are not-to-scale schematic representations.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein.

FIG. 1 is a graph 100 reporting an exemplary signal strength (RSSI) vs. Time (seconds), received by a mobile radio unit mounted on a train passing across the mast of a wayside base station. In the illustrated example, the signal is received by a mobile radio station (e.g., an apparatus) mounted on a moving vehicle, in particular a moving train. A plurality of fixed wayside base stations are arranged along a pathway on which the train is moving at a certain speed relative to the base stations. Each base station is configured to periodically transmit hello packets that are received by a mobile radio unit of the mobile radio station. A typical handoff procedure between base stations is based on the best signal strength for the establishment of the radio communication link with a wayside base station. In particular, the signal strength of the incoming hello packets from the base stations in communication with the radio unit is continuously monitored. At a given time, the mobile radio unit is in radio communication link with a current base station and, when a neighbor base station is detected to have a highest signal strength among the neighbor base stations including the current base station, a handoff is performed in order to ensure signal performance. Typically, in the proximity of a base station, i.e., close to the mast carrying the base station, the mobile radio unit receives the highest signal.

In graph 100, measured RSSI values are represented by a solid line (dBm, left y-axis). The signal strength increases as the mobile RU approaches the mast of the base station and then exhibits a sharp fall of a whopping ~30 dBm in the proximity of the mast position, which may represent the entry into the keyhole. In this example, the hole lasted for about 9 seconds and then the signal strength increased again to about 55 dBm, when the train exited the keyhole. Graph 100 shows also the transmission data rate in downlink and uplink (bidirectional transmission), namely the data throughput in kbps, to/from the on-board radio unit, represented by a dashed line (right y-axis). At the keyhole, the throughput exhibits a very deep and wide fall down to 0 kbps to increase again after having passed the coverage hole.

One observation herein is that a substantial absence of data transfer at recurring time intervals corresponding to the keyhole occurrences may lead to a severe degradation of MIMO service performance.

Figure 2:
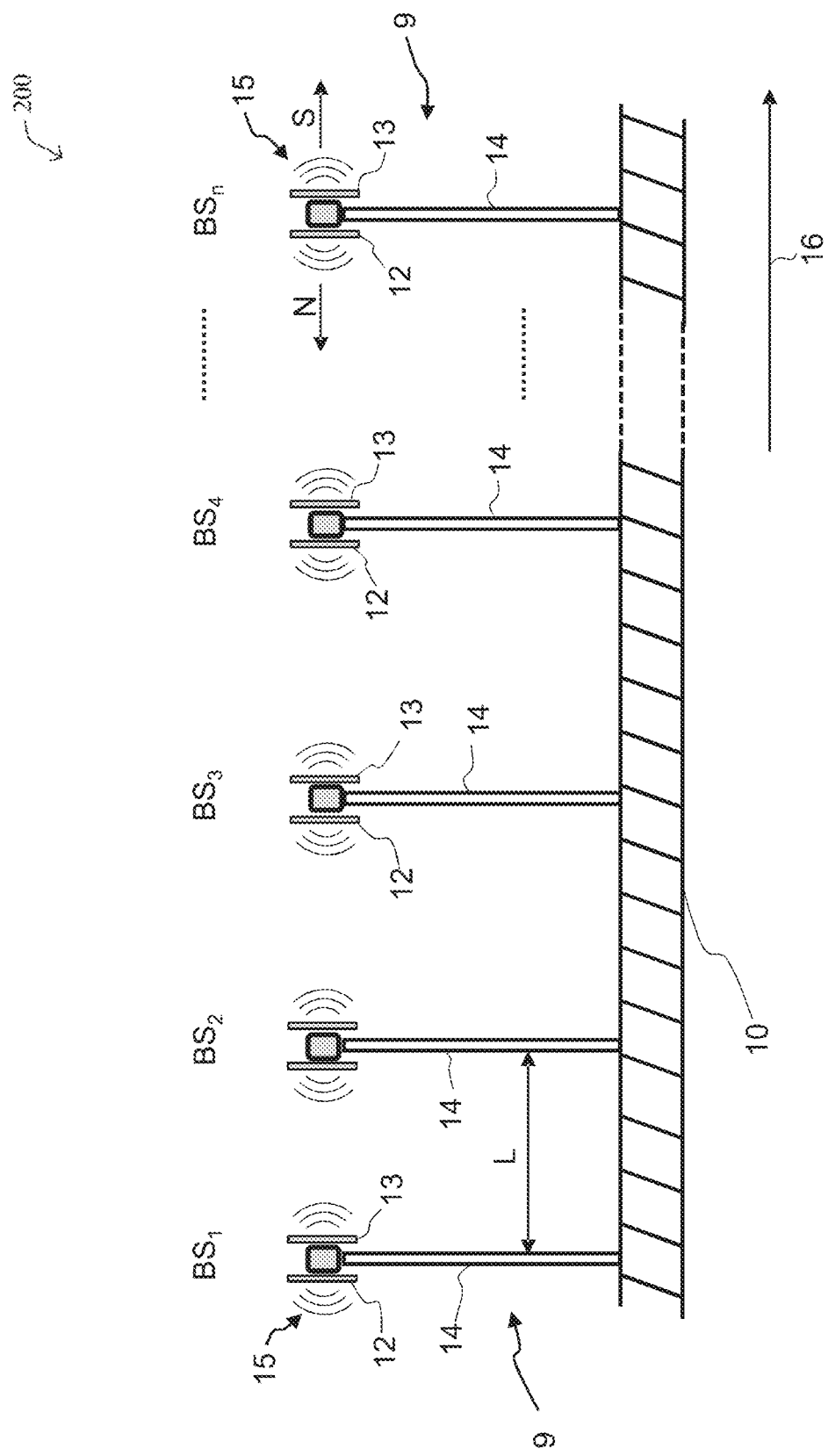
FIG. 2 is an example pictorial diagram of a pathway along which a plurality of wayside radio base stations is arranged in accordance with the present disclosure.

FIG. 2 is a pictorial diagram 200 of a pathway 10 along which a plurality of wayside base stations 9 are linearly arranged. The plurality of base stations 9 (e.g., $BS_1$, $BS_2$, $BS_3$, $BS_4$, ..., $BS_n$) may be located along pathway 10 (e.g., a railway, runway, road, etc.), and spatially separated from one another along pathway 10 at a distance L, with L being a constant or a variable value. Note that pathway 10 may be substantially linear or may be curved, in various embodiments.

In a typical configuration, each base station $BS_i$, i=1, 2, ..., n, is equipped with a wayside radio transceiver (not indicated in the figure) configured to send and receive radio frequency (RF) signals and a wayside antenna group 15 operatively coupled with the wayside radio transceiver. The wayside antenna group 15, and typically also the wayside radio transceiver, may be mounted on a freestanding mast 14. The wayside antenna group 15 is typically implemented with two separate directional antennas 12, 13 pointing two opposite directions along the pathway 10. The two opposite directions of the wayside antennas are denoted with "N" and "S" in FIG. 2, for "North" and "South," assuming a north-south moving direction. However, no specific meaning, such as a geographic relative location should be associated to these terms, which are meant to indicate merely two opposite directions along a pathway 10. In practice, one of the N and S directions is the travelling direction of a moving on-board radio station. In FIG. 2, direction 16 indicates the moving or travelling direction of an on-board radio station (not shown) moving along pathway 10.

In accordance with the present disclosure, each of the plurality of base stations 9, in particular the wayside radio transceiver of each base station, is set to operate at a respective radio frequency selected from a first frequency $f_1$ and a second frequency $f_2$. The base stations are arranged along the pathway 10 in a way that near adjacent wayside base stations have alternating frequencies.

For example, the first base station $BS_1$ may transmit over the first frequency $f_1$, while the second base station $BS_2$, near adjacent to $BS_1$, transmits over the second frequency $f_2$. The third base station $BS_3$ may transmit over the first frequency $f_1$, the fourth base station $BS_4$ over the second frequency $f_2$ and so on.

Preferably, all near adjacent base stations have alternated operating frequencies. For convenience only, in describing the system and method, increasing indices of the base stations 1, 2, ..., n are taken along the moving direction.

Figure 3:
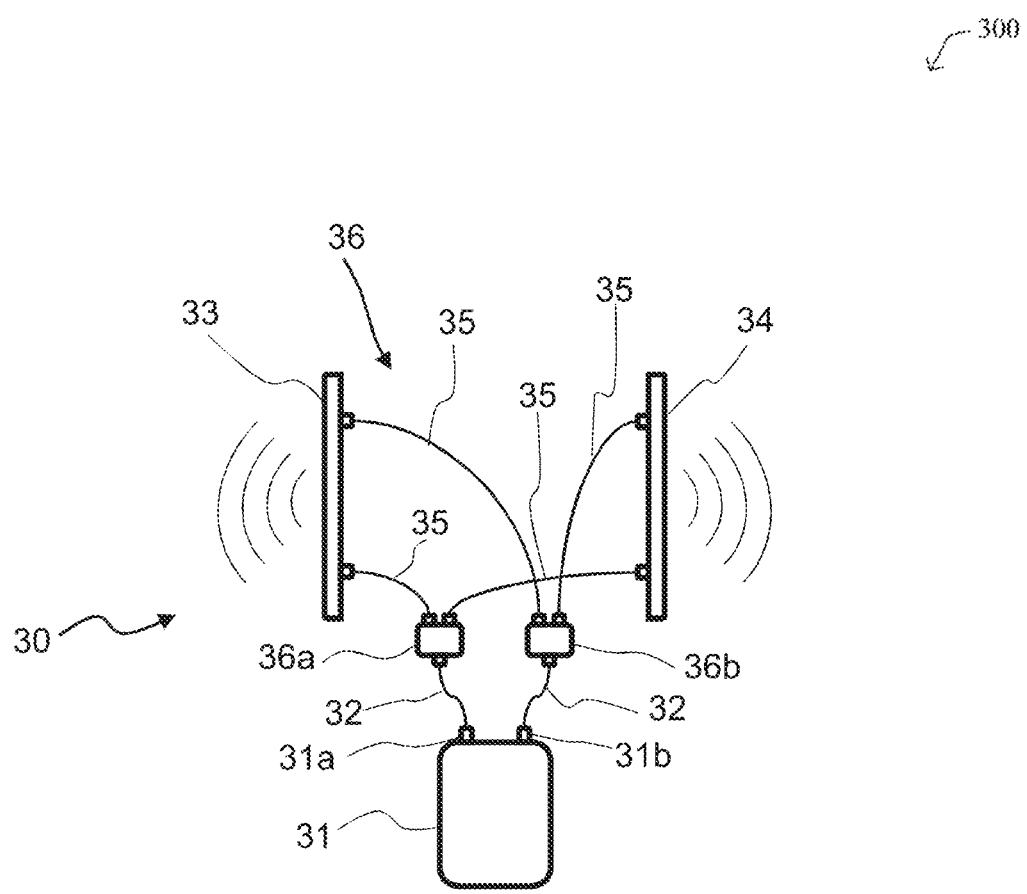
FIG. 3 illustrates an example wayside radio base station, according to an exemplary embodiment.

FIG. 3 illustrates an example 300 of main components of a wayside radio base station 30, according to an exemplary embodiment. As shown, base station 30 may comprise a wayside radio unit (RU) 31 and an antenna group 36 connected to the RU 31. The antenna group 36 has two directional antennas 33, 34. The wayside RU 31 comprises a transmitter and a receiver, i.e., a transceiver (not indicated), respectively configured to transmit and receive radio electromagnetic signals, in particular radio frequency (RF) signals, at a frequency in a frequency band of a respective channel assigned to the base station. The different channels have separate frequencies, typically separate frequency bandwidths. The operation frequency of each base station is one of the first frequency $f_1$ or the second frequency $f_2$.

Other typical components may be included in the wayside RU 31, such as RF electronic filters and amplifiers and processing circuitry including the functionalities for wireless network access via the transmitter/receiver as well as functionalities for processing data/signals.

In some embodiments, a wayside radio base station 30 may be a mobile phone base station of an existing public cellular networks or being part of a dedicated infrastructure. In base station 30, radio signals are fed through cables to the antennas and then launched as radio waves into the radio coverage area around the base station. Preferably, the frequency band is a Wi-Fi band, although other embodiments provide for the use of other bands. Preferably, the first and the second frequency are comprised within a wireless frequency band, for example, the 5 GHz band or the 2.4 GHz band. In addition, wayside radio base station 30 may be part of a dedicated network infrastructure. In an embodiment, the base stations support the Unlicensed National Information Infrastructure (U-NII) band at 5 GHz using the IEEE 802.11 medium access control (MAC) and physical layer (PHY) specifications.

In the example 300 depicted in FIG. 3, base station 30 is configured to support MIMO 2×2 wireless communication. The wayside RU 31 has two input/output ports 31a, 31b, each configured to receive and output RF signals. Each input/output port 31a, 31b is connected, e.g., via coaxial cables 32, to a respective RF signal splitter 36a, 36b. Each splitter 36a, 36b divides the RF signal emitted from the wayside RU 31 into two signals to be directed to the respective first and second directional antennas 33, 34 for the signal transmission. Analogously, the RF signals received from each antenna are sent through either splitter 36a, 36b to the RU 31. Each splitter is connected to both antennas 33, 34 by means of a respective coaxial cable 35. The two input/output ports 31a, 31b are used for both transmission and reception, at different sampling times, as typical in Wi-Fi protocols. Preferably, each directional antenna 33, 34 is a dual polarized MIMO panel antenna for transmitting and receiving RF signals having polarization diversity. For example, maximum powers for individual transmitters in the wayside base stations are about 0.05 to 1 watts (W), although the total radiated power from an antenna may be up to 0.2 W when multiple transmitters are present in a single base station.

In the example shown in FIG. 3, as both antennas 33, 34 are connected to the wayside RU 31 through RF signal splitters 36a, 36b, transmission and reception of RF signals from/to the wayside RU 31 cannot distinguish between the signals from the north or south antenna 33, 34. More generally, in the following, reference will be made to transmission and possibly reception of radio signals from/to a base station, which comprises an antenna system coupled to a wayside radio unit, in particular to a wayside radio transceiver.

Figure 4:
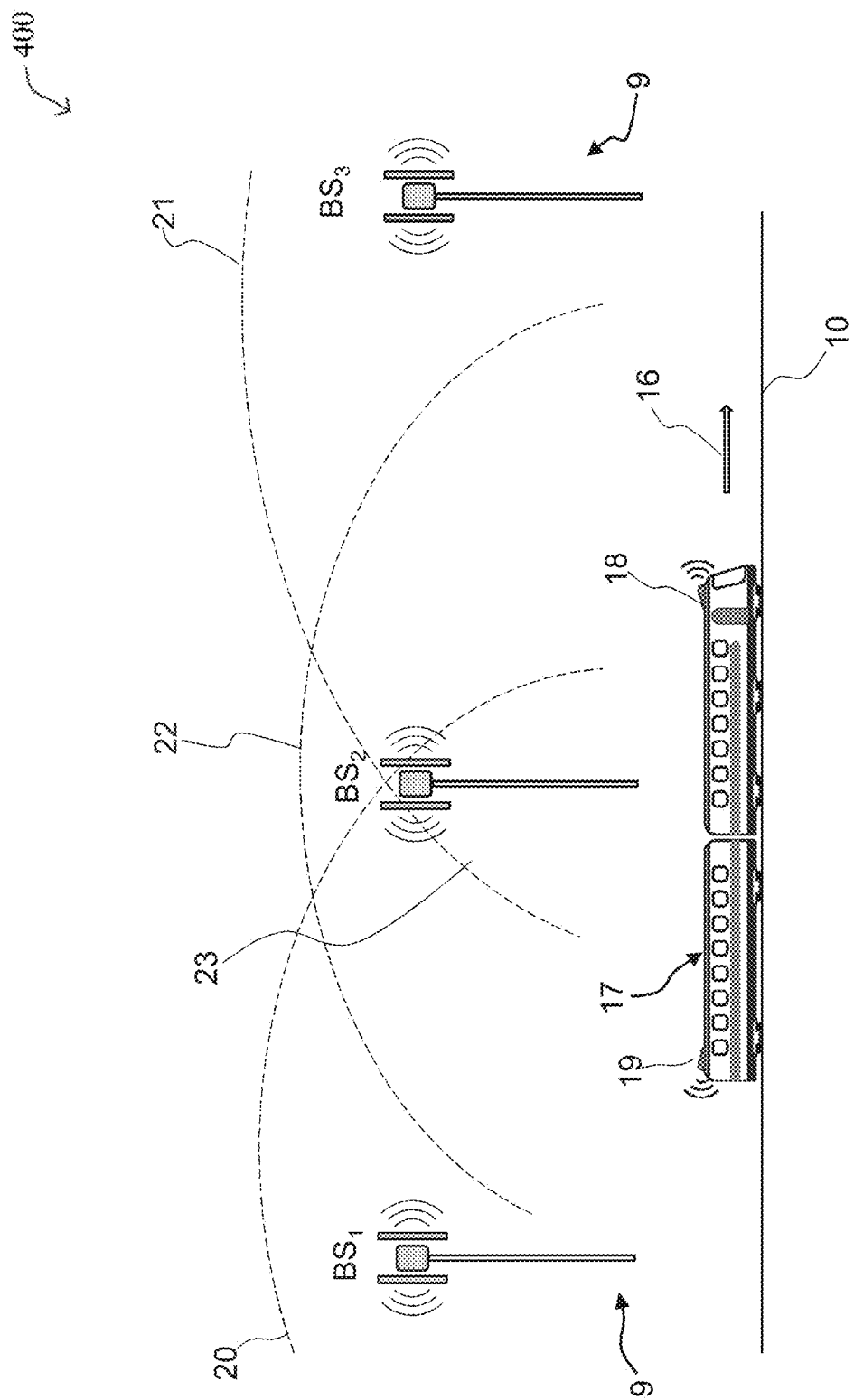
FIG. 4 is an example pictorial diagram of an exemplary train-to-ground wireless connection.

FIG. 4 is an example pictorial diagram 400 of a vehicle-to-ground wireless connection. A vehicle, in particular a train 17, is moving in travelling direction 16 along pathway 10 (e.g., a railroad track). Along pathway 10, a plurality of wayside radio base stations 9 are arranged. The train 17 is equipped with an on-board mobile radio station (not indicated in the figure) operatively coupled to a first and a second on-board mobile antenna 18, 19, which are preferably designed to create a directional radiation pattern.

Each of wayside base stations $BS_1$, $BS_2$, $BS_3$ ... defines a radio coverage area of radio communication, which is pictorially illustrated with areas 20, 21 and 22. Near adjacent base stations operate at different frequencies. For example, $BS_1$ and $BS_3$ operate at frequency $f_1$, whereas $BS_2$ operate at frequency $f_2$. Preferably, the base stations 9 along the pathway 10 are arranged such as the coverage areas of at least two near adjacent base stations which operate at different frequencies partially overlap one another in the direction of the pathway and coverage areas of two subsequent base stations along the pathway and operating at the same frequency (e.g., $BS_1$, $BS_3$) partially overlap one another in the direction of the pathway 10, resulting in a coverage redundancy with overlapping area 23 between radio coverage areas 20 and 21.

Figure 5:
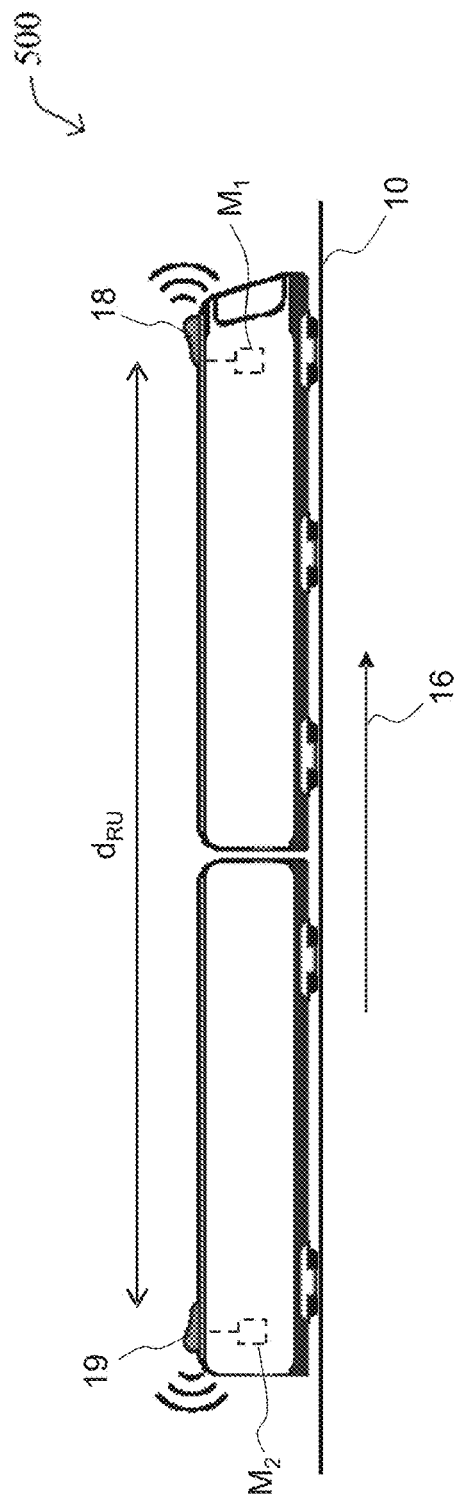
FIG. 5 is an example pictorial diagram of a train mounting a mobile radio station.

FIG. 5 is an example pictorial diagram 500 showing a train mounting a mobile radio station. The mobile radio station comprises a first radio unit, $M_1$ and a second radio unit $M_2$, which are located in the train at a distance from one another along the train length.

The mobile radio station is placed on-board of the train 17 and moves together with the train, possibly at a relevant speed such as in case of high-speed trains, e.g. 250-350 km/h. Each mobile radio unit comprises a mobile receiver and a mobile transmitter (e.g., a transceiver).

Each mobile radio unit $M_1$, $M_2$, briefly indicated herein also as mobile RU, is operatively connected with a respective first and second mobile antenna 18, 19. The mobile antennas 18, 19, which are typically positioned in the same portion of the train length as the respective radio units.

The first and second antennas 18, 19 are located at a distance dRU from one another along the train length. More generally, the first antenna 18 and the second antenna 19 are located in the vehicle at a distance from one another taken in the travelling direction 16 (e.g., along pathway 10).

The first mobile antenna 18 is positioned on a front part of the moving train 17 with reference to the travelling direction 16. Preferably, the second antenna 19 is positioned behind the first antenna 18 along the length of the moving train 17 taken in the travelling direction 16.

Specifically, the head antenna is mounted on a front part of the moving train, while the second antenna 19 is mounted on a rear part of the moving train, the first and second mobile antennas being positioned at the distance dRU from one another.

Preferably, first and second mobile antennas 18, 19 are directional antennas designed to create a directional radiation pattern and they are mounted on the train so that their radiation patterns point two opposite directions, one of the two opposite directions being in the moving direction 16. In particular, the first antenna 18 at the front of the train 17 points the travelling direction 16, taken as the positive direction, while the second antenna 19 points a direction opposite to the travelling direction 16.

In a typical configuration, the mobile antennas 18, 19 are located on top of the train 17 for radio communication with the wayside base stations.

In embodiments described with reference to the figures, the first antenna 18 will be referred also to as head antenna and the second antenna 19 will be referred also to as tail antenna.

It is to be understood that the terms "front" or "head" and "rear" or "tail" depend on the travelling direction and are defined relative to the travelling direction. For example, the second mobile antenna 19 may act as head antenna when the train moves in a direction opposite to direction 16.

In a typical configuration, the head antenna 18 is placed on the head coach of the train 17 and the tail antenna 19 is placed on the tail coach of the train that may have any number of coaches.

For convenience of the description, the first radio unit at the front part of the train will be also referred to as head radio unit (or briefly head RU) and the second radio unit placed at the rear part of the train to as tail radio unit (or briefly tail RU).

Figure 6:
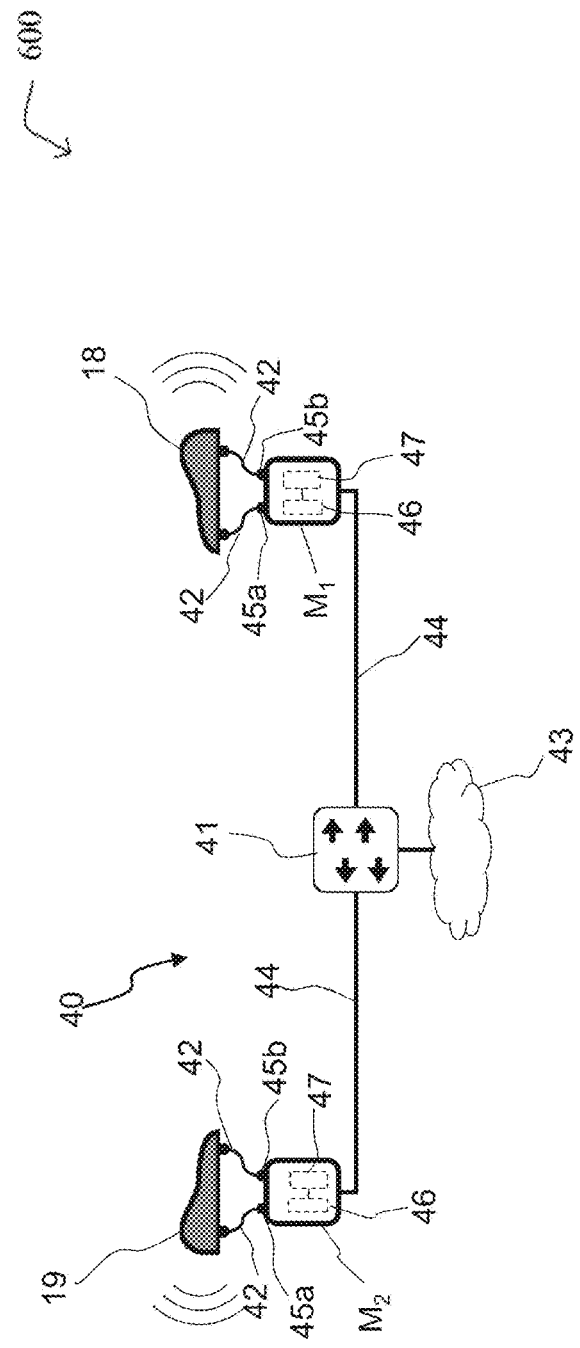
FIG. 6 illustrate an example on-board scheme of a mobile radio station mounted in a vehicle, according to an exemplary embodiment.

FIG. 6 illustrates an example 600 of an on-board scheme of a mobile radio station mounted on a train, according to an exemplary embodiment of the invention. A mobile radio station 40 comprises a first mobile RU $M_1$ and a second mobile RU $M_2$, each RU being configured to transmit and receive radio signals, in particular RF signals, by means of a respective transmitter and receiver, indicated as transceiver 46. In particular, the first mobile RU $M_1$ comprises a first mobile receiver and the second mobile RU comprises a second mobile receiver.

Each RU $M_1$, $M_2$ comprises a respective electronic processor 47, which includes the functionalities for wireless network access via the transceiver 46 as well as functionalities for processing data/signals as described herein including the control of the frequency switch of the transceiver between the two frequencies. Electronic processor can be a microprocessor, such as a microprocessor having a Microprocessor without Interlocked Pipeline Stages (MIPS) or an x86 architecture.

The first mobile RU $M_1$ is connected to the first moving antenna 18. The second mobile RU $M_2$ is connected to the second moving antenna 19. As customarily, $M_1$ and $M_2$ may be connected respectively to the first and the second moving antenna 19 through two RF connectors 45a, 45b via respective coaxial cables 42. Various RF connectors can be used including N-type, SMA, RP-SMA, QMA, etc.

Preferably, each of the first and the second moving antenna 18, 19 is a MIMO 2×2 dual-polarized antenna, such as a shark-fin antenna.

Each mobile radio unit $M_1$, $M_2$ is configured to receive incoming RF signals and in particular hello packets at a radio frequency selected between the first frequency $f_1$ and the second frequency $f_2$. In many circumstances, at a given instant of time, the mobile radio units are set to operate at different frequencies. Specifically, the mobile radio receivers may be set to receive hello packets at different frequencies so that when a radio unit operates at the first frequency, the other radio unit operates at the second frequency and vice versa.

Each mobile radio unit is configured to switch operating frequency from $f_1$ ($f_2$) to $f_2$ ($f_1$), in particular to dynamically change the operating frequency between the two frequencies $f_1$ and $f_2$.

To this end and in ways per se known, the transceiver 46 is configured to receive, from the respective electronic processor 47, control signals commanding the frequency switch.

The first and the second mobile radio units $M_1$, $M_2$ are operatively connected to an on-board network system 43 for signal distribution and/or access.

The network system 43 may be a wireless local area network (W-LAN) that include typical devices for signal distribution and/or wireless access, such as one or more wireless routers, a modem and a plurality of Wi-Fi access points to be deployed within the train in order to allow wireless devices, such as smartphone or tablets, to access the Internet by using the on board network system 43, in particular for broadband applications.

It is however to be understood that radio communication can be instead tailored to implement an automatic train control system that makes use of telecommunications between a mobile radio station installed in the train and the base stations on the ground for traffic management and infrastructure control. In this case, a system for Communications-based train control (CBTC) signal management with an integrated wireless communication network system 43, typically based either on the Wi-Fi standard, a wired CBTC communication system, or on a proprietary technology.

Preferably, the mobile radio units $M_1$, $M_2$ communicate with the network system 43 through a communication interface 41, in particular an Ethernet switch, such as an N-port Ethernet switch. More generally, the communication interface 41 is configured to provide cabled connectivity among the on-board network devices including the mobile base stations and Wi-Fi access points.

Typically, at each instant of time, each mobile radio unit $M_1$, $M_2$ of the mobile radio station on board the moving train is set at one of the two operating frequencies $f_1$, $f_2$ and receives radio signals from at least one wayside base station transmitting at the same frequency. Due to coverage redundancy, the first and/or the second mobile RU, at a certain instant of time, may receive radio signals from more than one base station, such as from two or more neighbor base stations transmitting at the frequency at which the RU is set. The wayside base stations in radio communication with the first and/or the second RU at the instant or time frame considered are referred in the present description and claims referred to as neighbor base stations. Non-neighbor base stations are those base stations of the plurality of wayside base stations, which, at the instant or time frame considered, either do not transmit or transmit signals that are low enough to be considered noise. The plurality of neighbor base stations of a mobile radio unit is typically a sub-plurality of the plurality of base stations deployed along the pathway 10, typically a small number m<n, for example from 1 to 3 base stations. In the present configuration, only the neighbor base station transmitting at the frequency corresponding to the frequency set at the mobile radio unit are communicating neighbor base stations.

At an instant of time, the radio communication between a mobile RU and a wayside base station may be represented by a pair <$M_x$, $BS_y$>, where $M_x$ is the mobile RU, with x=1, 2, and y=1, 2, 3, . . . , n, where n is the number of base stations deployed along the pathway travelled by the train. The pair <$M_x$, $BS_y$> can be seen as a combination of nodes defining a radio communication.

Each wayside base station $BS_y$ of the N base stations is configured to periodically transmit hello packets including identity information of the base station transmitting the hello packet. Identity information of a hello packet is represented by a unique identifier identifying the base station, ID-$BS_y$. Hello packets are transmitted on the first frequency $f_1$ or on the second frequency $f_2$ in accordance with the above indicated arrangement of the plurality of base stations along the pathway 10.

Each mobile radio unit $M_1$, $M_2$ of the mobile radio station is configured to receive hello packets transmitted from the same-frequency neighbor base stations and to measure the signal strength of each hello packet received.

The information on the signal strength emitted from a base station are typically represented by a Received Signal Strength Indicator (RSSI) value.

The periodical transmission of hello packets may take place in a frame of unsolicited data packet broadcast, according to known standards in wireless communication, for example in Wi-Fi standards IEEE 802.11. For example, each wayside base station may be configured to transmit hello packets with a periodicity of 10 packets per second.

In another embodiment, each mobile radio unit $M_x$ is configured to perform neighbor discovery, by monitoring continuously the signals received from the neighbor base stations, for example by using known discovery protocols of wireless communication standards. The transmitter of each mobile RU is configured to repeatedly transmit discovery requests, such as probe requests or probe request frames in case of standards IEEE 802.11, to inform the neighbor base stations about its existence. Neighbor base stations are configured to respond to the probe request frames by transmitting solicited hello packets, which are received by the receiver of a mobile RU.

Preferably, at each instant in time, the wireless communication between a wayside base station and the on-board mobile radio station takes place on a single communication link. In particular, at a given time, a single communication link, indicated also as the current link, is established between one wayside base station and one mobile radio unit of the mobile radio station. More preferably, at each instant of time, the communication between the mobile radio station and the wayside base stations is managed through a single radio communication link.

First and second radio units $M_1$, $M_2$ repeatedly receive hello packets periodically transmitted from the neighbor base stations in radio communication with one or both mobile radio units. Since the head radio unit and the tail radio unit can receive signals from base stations operating at the same frequency as that of the radio unit, in many cases, each mobile radio unit is in radio communication with a sub-plurality of neighbor base stations.

For each received hello packet, each mobile radio unit is configured to measure and store the signal strength of a received hello packet as an RSSI value. In particular, the respective electronic processor 47 connected to the transceiver 46 of the first or second radio unit is configured to receive from the transceiver 46 the radio signal associated with the hello packet and to determine the RSSI value of the electric signal. The RSSI values determined from the first and the second electronic processors 47 are stored in a memory space (not indicated in the figures) operatively coupled with each of the processors 47 or part of one of the two processors.

Preferably, one of the two electronic processors 47, is elected as master of the execution of the software code that stores the signal strength values received from both mobile radio units and manages the handoff procedures. The processor 47 selected as master is hereafter referred to as master processor. The other processor 47 is indicated as slave processor. Both the master and slave RU processors 47 are configured to receive radio signals, such as hello packets, from the respective radio unit and to determine the RSSI values of the received hello packets. Preferably, both the master and slave processors 47 are programmed to command the frequency switching operation.

Transmission of the data from the slave processor to the master processor may take place through the communication interface 41 (e.g., an on-board switch) via the cabled connection 44. In this way, the master processor can "master" the handoff process for both radio units.

The designation of a RU as master and thus of the other RU as slave may take place automatically at the initialization of the mobile radio station, e.g., when the mobile radio station is powered up, according to known algorithms, such as election algorithms, for example a Bully Algorithm.

Figure 7:
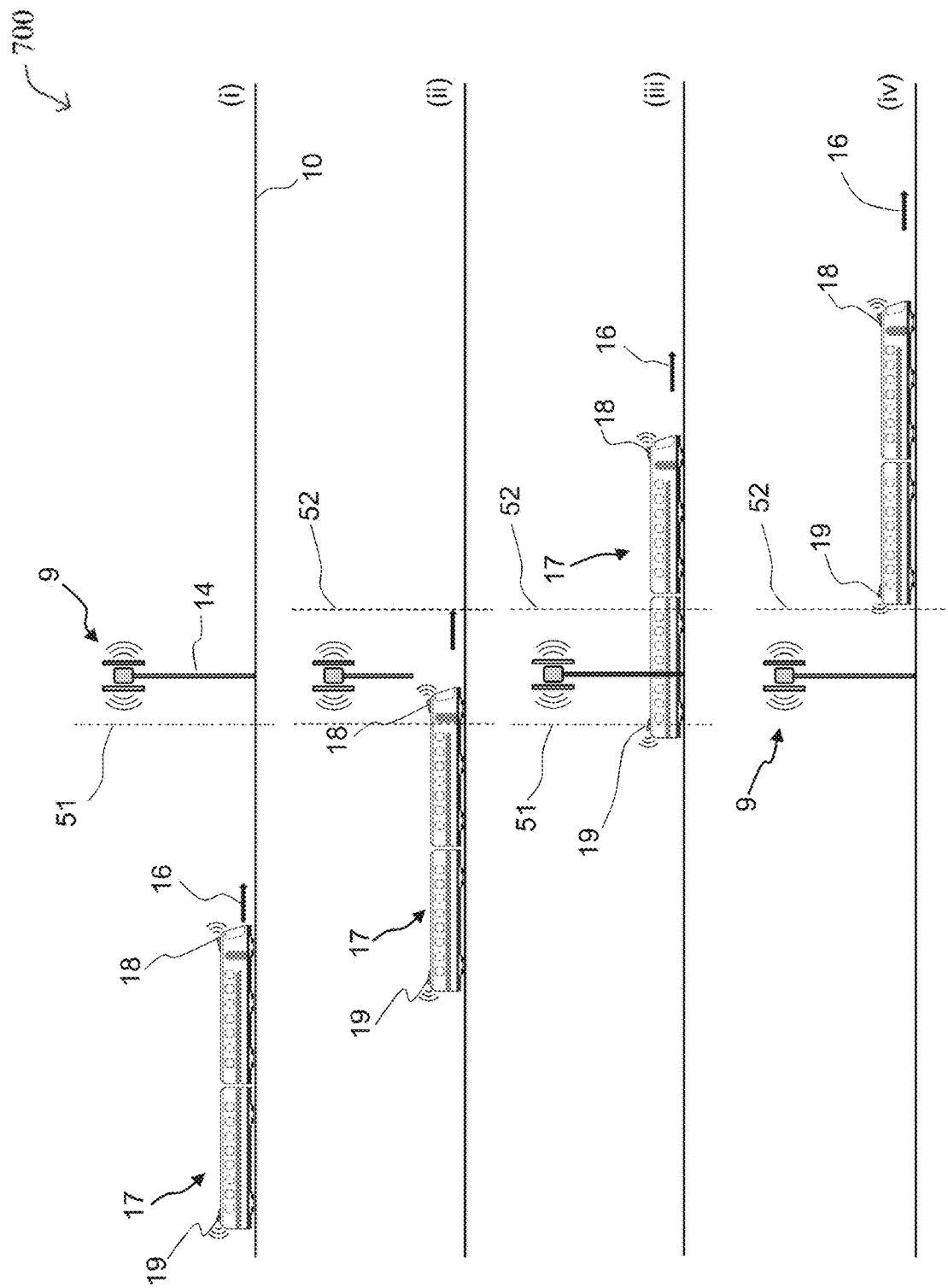
FIG. 7 is an example pictorial diagram of the train-to-ground wireless connection at the proximity of a base station.

FIG. 7 is an example diagram 700 of the train-to-ground wireless connection at the vicinity of a base station 9 to pictorially and schematically represent the entry to and exit from a keyhole in association with the relative position of a train and thus of the radio units of the mobile radio station. Same numbers indicate the same or similar features shown in previous drawings. For the sake of simplicity, a single base station is considered. The passing of the train through a wayside base station 9 may be divided in four main phases (i) to (iv):

in phase (i), train 17 is moving towards base station 9 and the head radio unit is set at the same frequency as the operating frequency of base station 9. The RSSI values received by the moving head antenna 18 at the front of the train steadily increase as the train approaches base station 9 reaching its maximum when the head antenna has reached the base station. The time indicated with line 51 represents the time when the head antenna 18 approaches very closely the mast 14 of base station 9 and thus enters the keyhole;

in phase (ii), the head RU has entered the keyhole and it is largely unable to communicate with base station 9 due to keyhole effect;

in phase (iii), the RSSI values received from the head antenna are not anymore affected by the keyhole of base station 9. Line 52 represents the time when head antenna 18 moves away from the mast, namely the egress point of the keyhole. The RSSI values received by the moving tail antenna 19 at the rear of the train rapidly increase as the tail of the train approaches base station 9 and enters the keyhole. During this phase, the radio communication between the tail RU and the base station may suffer from the keyhole effect if it is set at the same frequency as that base station 9;

in phase (iv), the train moves away from base station 9 and exit the keyhole and the RSSI values received by the tail RU slowly decrease. The head antenna may be far from base station 9, which has become a non-neighbor base station.

The head radio unit $M_1$ is typically the first to approach a base station and thus to enter the keyhole of that base station. The head radio unit $M_1$ is set to operate at one of the two frequencies, e.g. The first frequency $f_1$ and, at a certain instant of time, is in a current radio communication link with a current base station $BS_c$ set at the first frequency $f_1$. The head radio unit repeatedly receives hello packets periodically transmitted from the current base station $BS_c$ and, by means of processor 47 to determine the RSSI values associated with the received hello packets. The RSSI values associated with the current base station $BS_c$ are stored in a memory space operatively coupled with the master processor and repeatedly analyzed by the master processor to determine whether a RSSI value is larger than a threshold signal strength value, TH.

The threshold RSSI value TH is a numerical indication that the head radio unit is inside the keyhole of the current base station $BS_c$.

If the tail radio unit is set at the second frequency $f_2$, while the head radio unit $M_1$ is in radio communication link with the current base station at $f_1$, the tail radio unit $M_2$ repeatedly receives hello packets periodically transmitted from one or more neighbor base stations set at the second frequency $f_2$. The electronic processor 47 operatively coupled to the tail radio unit determines the RSSI values associated with the received hello packets and, if this electronic processor is elected as master processor, it stores the RSSI values in the memory space. If the electronic processor of the tail radio unit is elected as slave processor, it will send the RSSI value to the master processor for the storing.

Any RSSI value relative to the head and the tail radio unit is stored in association with a respective base station identifier and a respective radio unit identifier. For example, each RSSI value is associated with a pair $<M_x, BS_y>$.

Preferably, the RSSI values and the associated base station identifiers and radio unit identifiers are stored in a neighbor table as table entries.

The base stations included in the neighbor table are neighbor base stations and, depending on the frequency set at the mobile radio units, may be handoff candidate base stations for either or both the head and the tail radio units.

In general, the shorter the distance between a wayside base station and the moving antenna 18, 19 of a radio unit, the larger the RSSI value of the hello packet received by the receiver of that radio unit. As the mobile RU travels, the received hello packets from the neighbor base stations vary in strength and this causes the processor to repeatedly change the signal strength values stored in the neighbor table.

The slave processor is programmed to measure the RSSI of the received hello packets and transmits in real time the determined RSSI values to the master processor which then enters them into the neighbor table. The slave RU will transfer the data based on the received hello packet to the master processor, which is programmed to input the information into the neighbor table.

Typically, the neighbor table is updated by means of a table update procedure run by the master processor anytime a hello packet is received, the hello packet including a base station identifier of the base station transmitting it and being stored in association with the radio unit identifier of the mobile RU that has received the hello packet.

Table 1 below is a conceptual example of neighbor table reporting values of $RSSI_{xy}$ associated with the base station identifier $ID\text{-}BS_y$ (y=1, 2, . . . , n) as received by either of the mobile radio units $M_1$, $M_2$, the radio unit being identified by a mobile radio unit identifier $ID\text{-}M_x$ (x=1, 2).

TABLE 1

| Mobile RU | Base Station ID | RSSI value |
|---|---|---|
| $ID\text{-}M_1$ | $ID\text{-}BS_2$ | $RSSI_{12}$ |
| $ID\text{-}M_2$ | $ID\text{-}BS_1$ | $RSSI_{21}$ |
| $ID\text{-}M_2$ | $ID\text{-}BS_2$ | $RSSI_{22}$ |
| $ID\text{-}M_1$ | $ID\text{-}BS_3$ | $RSSI_{13}$ |

The table is preferably a dynamic read table automatically updated when a new hello packet is received by either the head radio unit or the tail radio unit.

In particular, a new row is added in the table when the entry pair $<M_x, BS_y>$ is not present in the table (i.e., no existing radio communication between $M_x$ and $BS_y$) or an existing row representing the radio communication $<M_x, BS_y>$ is updated when a new value of RSSI is measured by the mobile receiver $M_x$ in the hello packet from $BS_y$.

To this purpose and in ways per se known, the master processor 47 is programmed to automatically enter, in real time at the reception of a hello packet the new information in the table. The slave processor may be programmed to send the information on the $RSSI_{xy}$ values as entry pair $<M_x, BS_y>$ to the master processor.

The neighbor table is preferably stored in a non-transitory memory space operatively coupled with the master processor or part of the master processor.

When a mobile RU moves away from a base station, eventually it will not receive hello packets from that base station, which has become a non-neighbor base station. The master processor may be programmed to delete a row from the neighbor table if the value of the RSSI of that row has not been updated for a preset time interval.

In an embodiment, the table may include a timestamp, e.g., stored in an additional column, associated to the time at which the RSSI value has been entered and, when a preset time interval between the entry time and the actual time is larger than a predetermined time value, the row containing the "old" RSSI value is deleted from the table.

It is noted that the neighbor table is frequency agnostic. More generally, the handoff procedure based either on the detection of a RSSI value larger than a threshold or on the best RSSI value is frequency agnostic because at any time the radio communication can take place only over a same frequency.

In the following description, passages or operations are described with generic reference to an electronic processor, which is, in a master-slave configuration, the master processor for determining the RSSI values of the received hello packets and the management of the handoff procedures or the slave processor for determining the RSSI values of the received hello packets and the transmission of said RSSI values associated with the identifiers to the master processor. To execute the process, in a usual way, each mobile radio unit may comprise a computer-readable storage medium operably connected to the electronic processor, the computer-readable storage medium configured to store instructions executable by the processor and data accessible by the processor.

To determine if the signal strength of the current base station in radio communication link with the head radio unit has exceeded a threshold signal strength value, the electronic processor is programmed to repeatedly query the neighbor table to determine the current RSSI value, $RSSI_c$, and to compare the $RSSI_c$ value with a given threshold value of RSSI, TH.

If, from the analysis of the RSSI values associated with the current base station, an RSSI value is determined to be larger than the TH value, a handoff trigger is generated, and the electronic processor is programmed to proceed with:

1) analyzing the stored RSSI values associated with the tail radio unit $M_2$ by querying the table rows including the identifier of the tail radio unit, ID-$M_2$, to select a neighbor base station associated with the highest signal strength value as first destination base station $BS_{d1}$, and
2) forcing a handoff from the head radio unit $M_1$ to the tail radio unit $M_2$ by commanding a disconnection of the head radio unit from the current base station and a connection of the tail radio unit with first destination base station $BS_{d1}$ so as to establish a new radio communication link between the tail radio unit and the first destination base station $BS_{d1}$.

Upon handoff from the head radio unit $M_1$ to the tail radio unit $M_2$, a timer is set, which starts a time interval indicated as keyhole time duration $\Delta t_k$.

At the setting of the timer that starts the keyhole time duration $\Delta t_k$, the current communication link is between the tail radio unit and the first destination base station $BS_{d1}$. The handoff triggers also a frequency switch in the head radio unit $M_1$ from the first frequency $f_1$ to the second frequency $f_2$. In particular, upon handoff to the first destination base station $BS_{d1}$, the electronic processor is programmed to command the initialization of a frequency switching operation in the head radio unit to switch the frequency from $f_1$ to $f_2$. At the end of the frequency switching operation, the head radio unit $M_1$ is configured to receive hello packets from neighbor base stations operating at the second frequency $f_2$.

Preferably, the setting of the timer starting the keyhole time duration and the frequency switching operation in the first mobile radio unit may take place simultaneously upon handoff from the first radio unit to the second radio unit.

During the frequency switching operation, the head radio unit (but the same can be said for the tail radio unit), is inactive as it is unable to carry out the main functionalities of receiving and transmitting radio signals.

Preferably, the electronic processor is notified by the head radio unit once the frequency switching operation is completed and thus that the head radio unit is again active and capable of receiving hello packets.

The time required for a frequency switching operation from $f_1$ to $f_2$ and vice versa in a radio unit generally depends on the radio hardware equipment and may widely vary, for example from less than 1 millisecond (ms) to more than 400 ms.

Frequency switching speed in a commercial radio unit may be known as product specification or may be inferred from the time between the initialization of the frequency switching and the notification to the electronic processor that the operation has been completed.

At the end of the frequency switching operation, the first radio unit $M_1$ is configured to receive hello packets from the neighbor base stations set at the second frequency $f_2$. Therefore, both radio units are temporarily configured to receive hello packets over the second frequency $f_2$ and the neighbor table contains entries relative to both $M_1$ and $M_2$.

Typically, the keyhole duration, which may be selected on the basis of the configuration of the base station system, is significantly larger than the expected time required for the frequency switching operations in the head or tail radio units.

Preferably, the keyhole time duration $\Delta t_k$ is a predetermined time value, for example of from 10 to 20 seconds.

From the setting of the timer starting the keyhole duration $\Delta t_k$, the second radio unit $M_2$ in radio communication link with the first destination base station $BS_{d1}$ continues to receive hello packets from neighbor base stations set at the second frequency $f_2$, the neighbor base stations including the first destination base station $BS_{d1}$.

Preferably, during the keyhole duration $\Delta t_k$, the best signal strength value of the base stations transmitting at the second frequency $f_2$ is searched with the aim of performing a handoff from the first destination base station $BS_{d1}$ and possibly from the tail radio unit $M_2$ if a determined highest signal strength value is associated with a base station other than $BS_{d1}$. If, at a certain time during the keyhole duration, the best RSSI value is determined to be associated with a second destination base station $BS_{d2}$, other than $BS_{d1}$, this best RSSI value may be received by either the head or the tail radio unit.

To this end and according to an embodiment, upon setting of the timer starting the keyhole duration $\Delta t_k$, the electronic processor is programmed to repeatedly query the neighbor table to determine in the stored RSSI values the highest RSSI value and, in case a highest RSSI value is associated with a base station other than $BS_{d1}$, to force a handoff from the first destination base station $BS_{d1}$ to a second destination base station $BS_{d2}$.

If the best signal strength value associated with the second destination base station $BS_{d2}$ is associated with the tail mobile radio unit $M_2$, the electronic processor is programmed to force a handoff from the first destination base station $BS_{d1}$ to the second destination base station $BS_{d2}$. If the mobile radio unit associated with the second destination base station $BS_{d2}$ is the first radio unit $M_1$, the handoff comprises a handoff from the tail radio unit $M_2$ to the head radio unit $M_1$. A new radio communication link is then established between the second destination base station $BS_{d2}$ and one of the head and the tail radio unit.

The check on the threshold RSSI value may be carried out also during the keyhole duration. However, in most practical cases, the event that the threshold value is exceeded by the base station in current communication link with a mobile radio unit is not very likely to occur.

No handoff or more than one handoff may take place during the keyhole time duration.

At the end of the keyhole time duration $\Delta t_k$, the current radio communication link between a current base station, e.g., $BS_{d1}$ or $BS_{d2}$, may be associated with the head radio unit $M_1$ or with the tail radio unit $M_2$.

Preferably, the electronic processor 47 is programmed, upon lapse of $\Delta t_k$, to determine if the current radio communication link is associated with the head radio unit or the tail radio unit.

If the current radio communication link is determined to be associated with the head radio unit $M_1$, the electronic processor is programmed to command the tail radio unit $M_2$ to execute a frequency switching operation to switch the frequency from $f_2$ to $f_1$. At the end of the frequency switching operation, the tail radio unit $M_2$ is configured to receive hello packets from neighbor base stations operating at the first frequency $f_1$.

In an embodiment, upon lapse of $\Delta t_k$, if the current radio communication link is determined to be associated with the tail radio unit $M_2$, the electronic processor is programmed to command a frequency switching operation in the tail radio unit $M_2$ to switch the frequency from $f_2$ to $f_1$. During the switching operation in the tail radio unit $M_2$, the tail radio unit $M_2$ is unable to communicate with any base station. Upon completion of the switching operation, the algorithm preferably proceeds with the search of the best RSSI value, i.e. The highest RSSI value in the neighbor table, associated with either $M_1$ or $M_2$. As a time interval has passed from the forced handoff from the base station having an RSSI above threshold as received by the head radio unit, the tail radio unit is expected to have passed through that base station and thus to receive hello packets over the first frequency $f_1$ (also) from that base station. Thus, the best signal is likely to be (yet not necessarily) that received by the tail radio unit and associated the base station BSc previously excluded because above threshold.

One observation herein is that disconnection from the current communication link in the tail radio unit during frequency switching generally involves minimal traffic disruption when the time required for the switching operation is relatively short, for example less than about 2-3 ms. However, in case the time required to set the tail radio unit to a different radio frequency is relatively long, for example larger than 5 ms and in particular larger than 10 ms, disconnecting the current link in the tail radio unit during the frequency change may be perceived as a service quality deterioration by the users connected with the mobile radio station.

In one embodiment, upon lapse of keyhole time duration $\Delta t_k$, if the current radio communication link is determined to be associated with the tail radio unit $M_2$, the electronic processor is programmed to:
  analyze the stored signal strength values associated with the head radio unit $M_1$ set at the second frequency $f_2$ to select a neighbor base station associated with the highest signal strength value as a temporary destination base station,
  force a handoff from the tail radio unit $M_2$ to the head radio unit $M_1$ and establishing a new radio communication link between the first radio unit $M_1$ and the temporary destination base station, and
  upon handoff to the head radio unit $M_1$, start a frequency switching operation in the second radio unit $M_2$ from said second frequency $f_2$ to said first frequency $f_1$ so that, at the end of the frequency switching operation, the second radio unit $M_2$ is configured to receive hello packets from neighbor base stations operating at the first frequency $f_1$.

At the end of the switching operation in the tail radio unit $M_2$, wherein the current communication link is associated with the first radio unit $M_1$ at $f_2$, the tail radio unit starts receiving hello packets over the first frequency $f_1$. The algorithm preferably proceeds with the search of the best RSSI value, i.e. The highest RSSI value in the neighbor table, associated with either $M_1$ or $M_2$. Also, in this case, the best signal is likely to be (yet not necessarily) that received by the tail radio unit and associated the base station $BS_c$ previously excluded because above threshold.

Preferably, at the end of the frequency switching operation that "swaps" the frequencies between head and tail radio units, the electronic processor, while repeatedly querying the neighbor table to determine the highest signal strength value, is programmed to carry out the iterative analysis of the RSSI values of the current base station to determine if an RSSI value exceeds the threshold value and, in the positive, to force a handoff from the head radio unit to the tail radio unit and to a neighbor base station in communication with the tail radio unit.

Preferably, at the end of the frequency switching operation in the head (tail) radio unit, the electronic processor is programmed to command the removal of all entries associated with the head (tail) radio unit from the neighbor table.

According to one method described in the foregoing embodiments, since the head radio unit is the first radio unit to approach a base station in the moving direction, performing a handoff to the tail radio unit when the latter is not affected by the keyhole effect of that base station and then back to the head radio unit prevents or reduces loss of data transfer occurring periodically at the positions of the base stations.

Figure 8:
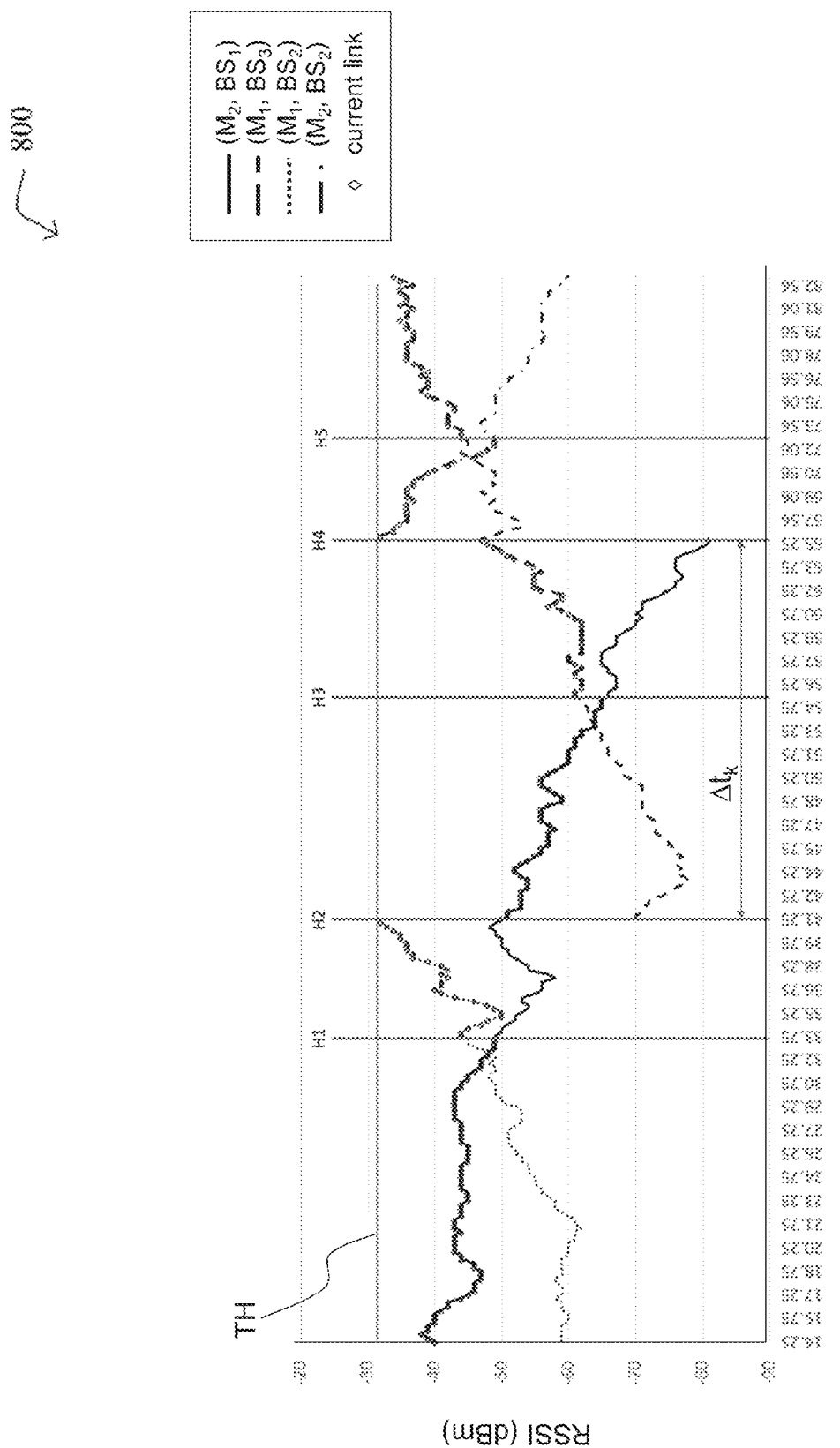
FIG. 8 is an example graph reporting the downlink RSSI of neighbor base stations plotted as a function of time and the current link resulting from the application of a handoff algorithm according to an exemplary embodiment of the present disclosure, in a first scenario.

FIG. 8 is an exemplary graph 800 reporting the downlink signal strength (RSSI) of neighbor base stations plotted as a function of time as measured by an on-board mobile radio station of the type shown in FIG. 4, which is mounted on a train moving in a subway tunnel in the moving direction from left to right of the graph (time line). In the time interval shown in the graph, a sequence of handoffs H1 to H5 takes place, in accordance with a first network scenario. The threshold RSSI value, TH, is a predetermined constant value indicated with a horizontal line.

In particular, graph 800 shows the RSSI signals received by the mobile station in a section of the rail track run by the moving train. In the section, neighbor base stations for the mobile radio station are $BS_1$, $BS_2$ and $BS_3$. Solid line represents the RSSI from $BS_1$, as received by the tail RU $M_2$ from the rear antenna at the end of the train. The dotted line represents the RSSI received by the head RU $M_1$ from the front antenna at the head of the train from base station $BS_2$, which is positioned near adjacent to $BS_1$ in the moving direction, i.e., consecutive to $BS_1$ in the moving direction. The dashed line is the RSSI of the third base station $BS_3$, as measured by the head RU $M_1$ receiving the signal from the head antenna. The dashed-dotted line represents the RSSI received by the tail RU $M_2$ from base station $BS_2$, which is positioned near adjacent to $BS_2$ in the moving direction. In this example, $BS_1$ and $BS_3$ and operate at the first frequency $f_1$, whereas and $BS_2$ operates at the second frequency $f_2$.

FIG. 8 shows an example graph 800 also the current communication link (diamond symbols) resulting from the application of a handoff algorithm according to an exemplary embodiment of the present disclosure. At the beginning of the graph, the tail RU $M_2$ is set to receive packets over frequency $f_1$, the head RU $M_1$ is set to receive packets over frequency $f_2$, and the radio communication link is between $M_2$ and $BS_1$. A handoff $H_1$ is performed from the current base station $BS_1$ to base station $BS_2$, which has a higher RSSI value than $BS_1$, as the train is approaching $BS_2$ with the head antenna. Handoff $H_1$ is based on the best signal strength of the neighbor stations when RSSI values of the current base station ($BS_1$) are determined to be smaller than or equal to the TH value.

The signal strength associated with $BS_2$ increases as the head RU $M_1$ approaches the location of the base station. When the signal strength of the current communication link between $M_1$ and $BS_2$ exceeds a TH value, a handoff H2 is forced from the head RU $M_1$ to the tail RU $M_2$ by establishing a link between the tail RU $M_2$ and base station $BS_1$ as first destination base station with the best signal strength among the neighbor base stations transmitting hello packets over frequency $f_1$ (pair $<M_2, BS_1>$). Upon handoff H2, the head RU $M_1$ switches frequency from $f_2$ to $f_1$ and a timer is triggered, the timer expiring after a time interval indicated above as keyhole duration $\Delta t_k$. During this time interval, a handoff H3, which is based on the best signal strength, takes place from the tail RU $M_2$ to the head RU $M_1$ and from $BS_1$ to $BS_3$ as second destination base station, when the signal strength of $BS_3$ exceeds that of $BS_1$ (i.e., new pair $<M_1, BS_3>$). This scenario thus assumes that, at the end of the keyhole duration, the current communication link is associated with the head radio unit. The time required for the switching operation in the tail radio unit is largely not relevant because the radio communication takes place with the head radio unit.

Upon lapse of $\Delta t_k$ (e.g., expiration of the set timer) the tail RU $M_2$ switches frequency from $f_1$ to $f_2$. When the keyhole duration $\Delta t_k$ ends, a connection may be established according to the pair having the highest signal strength.

In the scenario of FIG. 8, at this point, both the head radio unit $M_1$ and the tail radio unit $M_2$ have passed the keyhole at $BS_2$ and the tail radio $M_2$ may connect to the base station $BS_2$. In the example, upon lapse of $\Delta t_k$, a handoff H4 based on the best signal strength takes place to base station $BS_2$ that has the strongest signal.

Advantageously, during the keyhole duration $\Delta t_k$ corresponding to the head and tail radio units passing through the keyhole location at $BS_2$, both the head and the tail radio units are configured to operate on frequency $f_1$ so that they are excluded from receiving RF signals from the formerly current $BS_2$ transmitting over $f_2$ while they are enabled to connect to base stations adjacent to $BS_1$, which typically have a reasonably good quality signal.

It is noted that, at the time of handoff H4, the RSSI of $BS_2$ may exceed the threshold value TH since the train has already passed through the location of $BS_2$ and thus it has exited from the keyhole. According to an embodiment, a condition exists according to which, when the keyhole duration ends, the base station previously cut-off from the mobile radio units is again a candidate for the handoff for the radio unit receiving at the frequency of $BS_2$. More generally, a base station cannot be consecutively excluded more than once. This condition expresses the high likelihood that, when exiting the keyhole, the best signal is that of $BS_2$ because the mobile receiver is still positioned at the proximity of that $BS_2$, but outside the keyhole. In practice, the electronic processor, at the end of the keyhole duration, when querying the neighbor table to select the highest signal strength value, determines whether the highest signal strength value is associated with the formerly cut-off base station and, in the positive, forces a handoff to the formerly cut-off base station.

Figure 9:
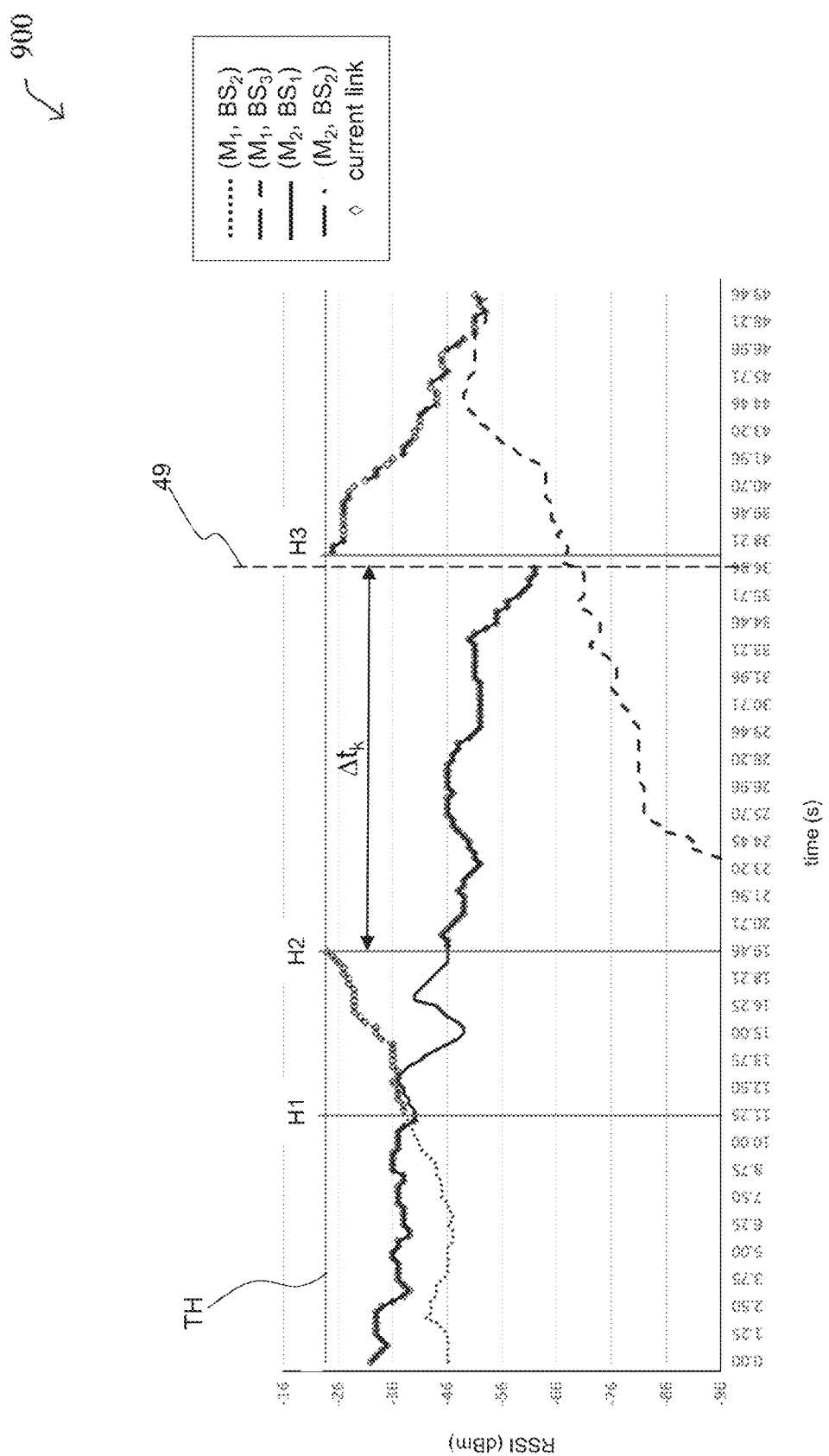
FIG. 9 is an example graph reporting the downlink RSSI of neighbor base stations plotted as a function of time and the current link resulting from the application of a handoff algorithm according to an exemplary embodiment of the present disclosure, in a second scenario.

FIG. 9 illustrates a further example graph 900 of a handoff process in a second network scenario, in which it is assumed that at the end of the keyhole duration $\Delta t_k$ the current communication link is established with the tail radio unit $M_2$, which is designed to perform a "fast" frequency switching operation. To show some details of the process, the time scale has been expanded relative the scale of FIG. 8. The same graphic symbols are used to indicate the same pairs $<M_x, BS_y>$ (x=1, 2 and y=1, 2, 3, . . . ) and the current communication link. At the beginning of the graph, the tail RU $M_2$ is set to receive packets over frequency $f_1$, the head RU $M_1$ is set to receive packets over frequency $f_2$, and the radio communication link is between $M_2$ and $BS_1$. The RSSI values of the current base station $BS_1$ do not exceed the TH value and as the train is approaching $BS_2$ with the head antenna, at a certain time, a handoff H1 is performed from the current base station $BS_1$ to base station $BS_2$, since $BS_2$ has reached a RSSI value higher than $BS_1$. Therefore, handoff H1 is based on the best signal strength of the neighbor stations.

The signal strength associated with $BS_2$ increases as the head RU $M_1$ approaches the location of the base station. When the signal strength of the current communication link between $M_1$ and $BS_2$ exceeds a TH value, a handoff H2 is forced from the head RU $M_1$ to the tail RU $M_2$ by establishing a communication link between the tail RU $M_2$ and base station $BS_1$ as first destination base station with the best signal strength among the neighbor base stations transmitting packets over frequency $f_1$. Upon handoff H2, the head RU $M_1$ switches frequency from $f_2$ to $f_1$ and a timer is triggered to expire after a predetermined keyhole duration $\Delta t_k$. During the keyhole duration, the current communication link between the tail RU $M_2$ and $BS_1$ is maintained because $BS_1$ remains the base station having the best signal strength. The lapse of the keyhole duration $\Delta t_k$ triggers a frequency switching operation in the tail RU $M_2$ from $f_1$ to $f_2$. Since the radio communication link is still associated with $M_2$, the switching operation causes a relatively short service disruption, in the example of less than 2 ms, during which the radio unit is inactive and is unable to receive signals from the base station to which it was in communication and thus no RSSI values can be measured. In the graph, the period of inactivity of $M_2$ starts at a time corresponding to the end of $\Delta t_k$, indicated with dashed vertical line 49. The radio communication with $BS_1$ is interrupted because of the change of frequency. Once the switching operation has been completed, the tail radio unit notifies its activity and starts receiving signals from the neighbor base stations transmitting over frequency $f_2$. This causes a handoff of tail RU to a base station having the best signal. In graph 900, a handoff H3 sets in radio communication link the tail radio unit $M_2$ with base station $BS_2$.

Figure 10:
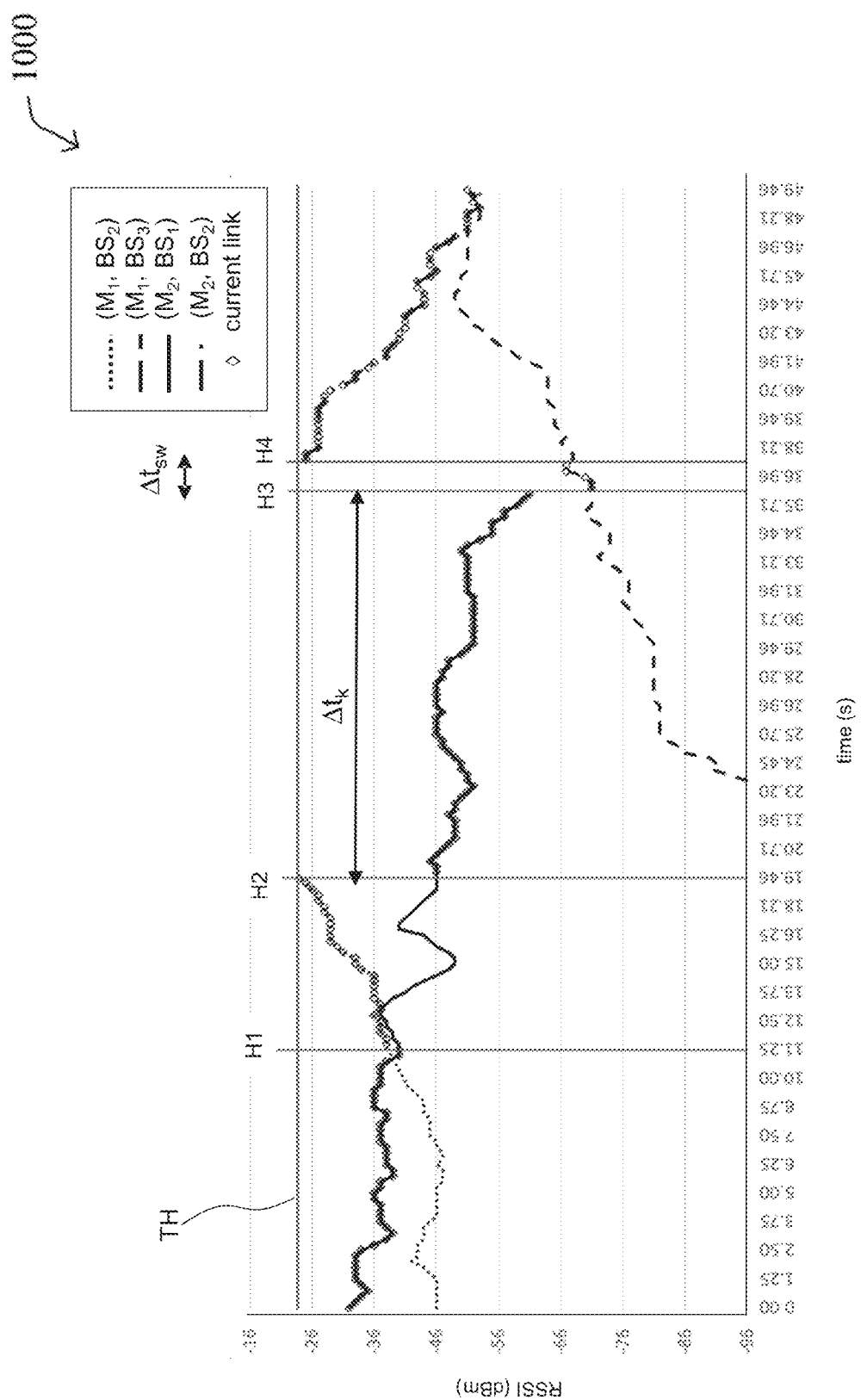
FIG. 10 is an example graph reporting the downlink RSSI of neighbor base stations plotted as a function of time and the current link resulting from the application of a handoff algorithm according to an exemplary embodiment of the present disclosure, in a third scenario.

FIG. 10 illustrates a still further example graph 1000 of a handoff process in a third network scenario, in which it is assumed that at the end of the keyhole duration the current communication link is established with the tail radio unit $M_2$, which is designed to perform a "slow" frequency switching operation. The time scale corresponds to that of FIG. 9. The same graphic symbols are used to indicate the same pairs $<M_x, BS_y>$ and the current communication link. The handoff process corresponds to that of FIG. 9 up to the end of the keyhole duration $\Delta t_k$. In this example, the time $\Delta t_{sw}$ required for the frequency switching operation is relatively long and would cause a non-negligible service disruption. To avoid service disruption, at the end of keyhole duration $\Delta t_k$, a handoff H3 is forced to the head radio unit $M_1$ set at frequency $f_1$ in communication with a neighbor base station having the best signal strength of the base stations transmitting over $f_1$. In the example, $M_1$ receives hello packets with having a significant signal strength only from $BS_3$. Once the switching operation has been completed, the tail radio unit $M_2$ notifies its activity at frequency $f_2$. The best signal strength is searched among the neighbor stations transmitting over frequency $f_2$ and $f_1$. In the example, $BS_2$ transmitting at $f_2$ has the best signal strength and a handoff H4 is forced to put the tail RU $M_2$ in radio communication link with $BS_2$.

Preferably, the handoff algorithm running in the electronic processor is aware of which of the two mobile radio units is the head radio unit in the moving direction, in practice the radio unit placed at the front of the vehicle relative to the moving direction. This information may be provided by a user as input data into a user interface connected to the mobile radio station, in particular with the electronic processor mastering the handoff process, or it may be provided by the vehicle IT equipment operatively connected with the mobile radio station. In another example, a GPS system mounted on the vehicle may transmits the information to the mobile radio station.

Another observation herein is that information regarding which radio is the head unit may not always be available from an external source. Therefore, an automatic detection of the head radio unit between the first and second radio units, in the following indicated also with "head detection," would be advantageous.

An exemplary embodiment of a method for head detection is described. The head detection procedure may be implemented as a starting phase before initialization of the handoff process herein described.

It is assumed that, when the train starts moving, the mobile radio station is not aware of the moving direction and thus of which of the two radio units is the head radio unit. The first and second radio units are set to receive RF signals and in particular hello packets over the same frequency, for example $f_1$. By referring to FIG. 2, in view of the arrangement of the plurality of base stations along the pathway with alternating frequencies, both mobile radio units receive hello packets from base stations $BS_1$, $BS_3$, $BS_5$, and so on.

Figure 11:
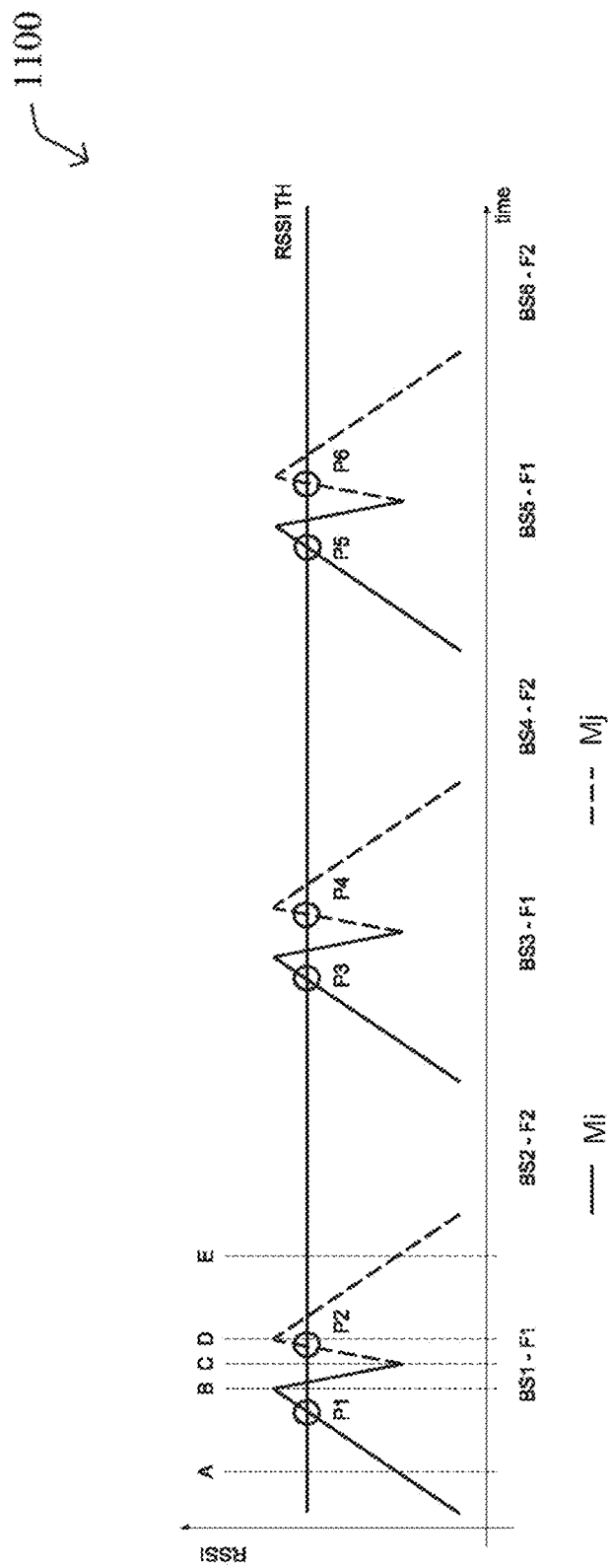
FIG. 11 is an example conceptual diagram illustrating the behavior of the radio signals received only from base stations set at one of the first and second frequencies.

FIG. 11 is an example conceptual diagram 1100 illustrating the behavior of the RSSI received from the "odd" base stations $BS_1$, $BS_3$, $BS_5$ . . . as a function of time as seen by the radio units. The "even" base stations $BS_2$, $BS_4$ . . . operate at $f_2$ and therefore they are not "visible" by the radio units. No frequency switch is executed during the head detection procedure. A head detection algorithm, which may run in the (master) electronic processor of the mobile radio station, is initialized when the train starts moving.

The electronic processor is programmed to analyze the received RSSI values associated with respective base station identifiers and the radio unit identifiers and to determine if an RSSI value is larger than a threshold RSSI value. The head detection algorithm uses a standard handoff algorithm based on the best signal strength for the handoff from one base station to an adjacent base station having the same frequency. The threshold RSSI value is a preset value threshold value TH, which may correspond to the value set for the plurality of base stations BSi (i=1, 2, . . . , n) during the execution of the handoff algorithm according to the present disclosure. The occurrence of a signal received by the head or the tail radio units having an RSSI value larger than the threshold value causes a trigger event that is registered in a memory space associated with the electronic processor. Each trigger event is stored in association with the base station identifier and a radio unit identifier, without the knowledge if that identifier indicates the head or the tail radio unit.

The electronic processor is programmed to count the number of times a same radio unit experiences a trigger event. At the occurrence of two consecutive trigger events by the same radio unit, the electronic processor is programmed to determine that that mobile radio unit is the head radio unit. For example, when the radio unit is determined to be the head radio unit, the electronic processor is caused to associate an identifier to the radio unit identifying the same as the head radio unit.

In diagram 1100, solid line indicates a sequence of events for a first radio unit Mi, whereas the dashed line indicates a sequence of events for a second radio unit Mj.

Upon initialization of head detection procedure, different scenarios may be possible.

It is first assumed that, upon initialization, a first radio unit $M_1$ is in radio communication link with the first base station $BS_1$ and the train moves across section AB of the pathway while approaching $BS_1$. At instant (position) P1, the RSSI of the signal received by radio unit Mi exceeds threshold TH and a first trigger event is registered in association with radio unit Mi. The radio unit Mi travels and the best signal remains that from $BS_1$ to Mi (i.e., no handoff to the other radio unit Mj). When the signal strength of $BS_2$ exceeds the signal strength of $BS_1$, a radio communication link is established between Mi and $BS_2$. As Mi approaches the position of the $BS_2$, the signal strength received from Mi exceeds the threshold and a second trigger event is registered in association with radio unit Mi. At the occurrence of the second consecutive trigger event associated with the same base station (Mi), the electronic processor determines that Mi is the head radio unit $M_1$.

In a second scenario, upon initialization, a second radio unit Mj is in radio communication link with the first base station $BS_1$ in section BD of the pathway, corresponding to a keyhole position as seen from radio unit Mj. At instant P2, radio unit Mj receives a signal with a signal strength larger than TH and a first trigger event is registered. The train travelling, Mi receives a stronger signal than Mj and a radio communication link is established between Mi and $BS_3$. A trigger event takes place at position P3, at the proximity of $BS_3$, which is associated with a different radio unit than that associated with the first registered trigger event. The electronic processor is configured to register the trigger event at P3 as first trigger event for radio unit Mi. As the train travels, radio unit Mi approaches $BS_5$ and, based on the detection of the best signal, a handoff is forced, and a radio communication link is established between Mi and $BS_5$ and at position P5 the signal strength exceeds TH. The electronic processor is programmed to register the trigger event in association with radio unit Mi and to determine that it is the second consecutive trigger event for radio unit $M_i$. At the occurrence of the second consecutive trigger event associated with the same radio unit ($M_i$), the electronic processor determines that $M_i$ is the head radio unit $M_1$.

In a third scenario, at the initialization of the head detection algorithm, the communication link is between $M_j$ and $BS_1$, with $M_j$ positions in section DE, outside the keyhole of $BS_1$. Based upon the best signal handoff, a communication link between Mi and $BS_2$ is established when the train approaches (with its head) $BS_2$. Similarly, to the first scenario, two consecutive trigger events in association with $M_i$ take place, in this case at $P_3$ and $P_5$ leading to the determination of $M_i$ as the head radio unit.

It is noted that every analyzed option leads to the same result of the identification of the head radio unit, although the total numbers of trigger events necessary to reach the result may differ for the three possible scenarios.

FIG. 12 is a flow chart 60 depicting an example of a handoff procedure consistent with an embodiment of the present disclosure.

Flow chart 60 exemplifies a procedure that starts from an event in the head radio unit $M_1$ in radio communication link with current base station $BS_c$ of a received signal strength value determined to be larger than the threshold signal strength value, TH (block 61). The event at block 61 triggers a forced handoff to the tail radio unit $M_2$ in connection with a base station $BS_x$ so as to establish a radio communication link <$M_2$, $BS_x$> (block 62). Upon the establishment of the communication link <$M_2$, $BS_x$> as the current link, a frequency switching operation is executed to switch in the first radio unit $M_1$ the first frequency $f_1$ to the second frequency $f_2$ and a timer is set for a time defining a keyhole time duration $\Delta t_k$ (block 63).

Preferably, during the keyhole duration in block 63, a handoff based on the best signal strength takes place so that at the expiry of the keyhole time duration the current communication link may be associated with either mobile radio unit (not indicated).

When the keyhole time duration $\Delta t_k$ expires (block 64), the procedure comprises determining if the current radio communication link is associated with the first radio unit $M_1$ (block 65).

If the current radio communication link is associated with the first radio unit $M_1$, a frequency switching operation is executed to switch in the second radio unit $M_2$ the second frequency $f_2$ to the first frequency $f_1$ (block 66). The procedure ends (block 67) to start again when an event of RSSI value exceeding the threshold value TH occurs in one of the two mobile radio units. As far as this event does not occur, handoff may be based on the best signal strength value.

If the current communication link is associated with the second radio unit $M_2$ and the time needed for the switching in $M_2$ from $f_2$ to $f_1$ is a "fast switching," the switch in $M_2$ is executed (block 71) and the procedure ends (block 67).

If the current communication link is associated with the second radio unit $M_2$ and the time needed for the switching is a "slow switching," a handoff is forced from $M_2$ to $M_1$ so as to establish a communication link between $M_1$ and a base station having the best signal strength value (block 69). Upon handoff, the switch in $M_2$ is executed (block 72) and the procedure ends (block 67).

It is to be understood that since a slow or fast switching is typically a property of the equipment used, the decision in block 68 does not need to be made every time the handoff procedure triggered by the keyhole occurrence is carried out. Once the properties of the mobile radio station are known, the algorithm may be set to always execute block 71 or 69 and 72 when the current link is determined, at block 65, to be associated with $M_2$.

In an example, during the keyhole time duration, the electronic processor is programmed to maintain the current communication link in the second radio unit $M_2$. In this case, when the timer expires, the electronic processor is programmed to switch the frequency from $f_2$ to $f_1$, possibly after having forced a handoff to $M_1$. By making reference to FIG. 12, the flow chart would not comprise block 65.

While there have been shown and described illustrative embodiments that provide for antenna keyhole management in wireless radio communication, it is to be understood that various other adaptations and modifications may be made within the spirit and scope of the embodiments herein. For example, while certain embodiments are described herein with respect to using certain wireless and/or wired communication protocols, such as Wi-Fi, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a mobile radio station in communication with a current base station of a plurality of base stations, hello packets from one or more base stations in the plurality of base stations, the mobile radio station receiving hello packets from the current base station on a first frequency via a first mobile radio unit and hello packets from one or more base stations in the plurality of base stations on a second frequency via a second mobile radio unit;
   determining, based on the hello packets, signal strength values associated with each of the plurality of base stations; and
   when the current base station is associated with a signal strength value that exceeds a threshold value:
   selecting a first destination base station from the plurality of base stations based on the first destination base station having a highest signal strength value among those base stations in the plurality of base stations that sent hello packets to the second mobile radio unit on the second frequency, and
   forcing a handoff from the first mobile radio unit to the second mobile radio unit, in part by establishing a new radio communication link between the second mobile radio unit and the first destination base station.

2. The method as in claim 1, further comprising:
   switching the first mobile radio unit from the first frequency to the second frequency, after performing the handoff from the first mobile radio unit to the second mobile radio unit.

3. The method as in claim 2, further comprising:
   receiving, via the first mobile radio unit and on the second frequency, one or more hello packets from the first destination base station.

4. The method as in claim 2, further comprising:
   removing all neighbor table entries associated with the first mobile radio unit, after switching the first mobile radio unit from the first frequency to the second frequency.

5. The method as in claim 1 further comprising:
   starting a timer for a keyhole time duration, after performing the handoff; and
   on expiration of the timer, switching the second mobile radio unit from the second frequency to the first frequency.

6. The method as in claim 1, further comprising:
starting a timer for a keyhole time duration, after performing the handoff; and
on expiration of the timer, forcing a second handoff from the second mobile radio unit to the first mobile radio unit, by establishing a new radio communication link between the first mobile radio unit and a temporary base station in the plurality of base stations, based on its associated signal strength value.

7. The method of claim 1, further comprising:
starting a timer for a keyhole time duration, after performing the handoff; and
forcing a second handoff from the second mobile radio unit to the first mobile radio unit, when the first mobile radio unit receives hello packets from a second destination base station with a higher signal strength value than that of the first destination base station and prior to expiration of the timer.

8. The method as in claim 1, wherein the mobile radio station is located on a moving vehicle traveling along a pathway.

9. The method as in claim 8, wherein the moving vehicle is a train and wherein the pathway comprises a railroad track.

10. The method as in claim 8, further comprising:
determining that the first mobile radio unit is a head radio unit located closer to a front of the moving vehicle than that of the second mobile radio unit.

11. An apparatus, comprising:
one or more network interfaces to communicate with a plurality of base stations;
a processor coupled to the one or more network interfaces and configured to execute one or more processes; and
a memory configured to store a process that is executable by the processor, the process when executed configured to:
receive hello packets from one or more base stations in the plurality of base stations, the apparatus receiving hello packets from a current base station on a first frequency via a first mobile radio unit and hello packets from one or more base stations in the plurality of base stations on a second frequency via a second mobile radio unit;
determine, based on the hello packets, signal strength values associated with each of the plurality of base stations; and
when the current base station is associated with a signal strength value that exceeds a threshold value:
select a first destination base station from the plurality of base stations based on the first destination base station having a highest signal strength value among those base stations in the plurality of base stations that sent hello packets to the second mobile radio unit on the second frequency, and
force a handoff from the first mobile radio unit to the second mobile radio unit, in part by establishing a new radio communication link between the second mobile radio unit and the first destination base station.

12. The apparatus as in claim 11, wherein the process when executed is further configured to:
switch the first mobile radio unit from the first frequency to the second frequency, after performing the handoff from the first mobile radio unit to the second mobile radio unit.

13. The apparatus as in claim 11, wherein the process when executed is further configured to:
receive, via the first mobile radio unit and on the second frequency, one or more hello packets from the first destination base station.

14. The apparatus as in claim 11, wherein the process when executed is further configured to:
remove all neighbor table entries associated with the first mobile radio unit, after switching the first mobile radio unit from the first frequency to the second frequency.

15. The apparatus as in claim 11, wherein the process when executed is further configured to:
start a timer for a keyhole time duration, after performing the handoff; and
on expiration of the timer, switch the second mobile radio unit from the second frequency to the first frequency.

16. The apparatus as in claim 11, wherein the process when executed is further configured to:
start a timer for a keyhole time duration, after performing the handoff; and
on expiration of the timer, force a second handoff from the second mobile radio unit to the first mobile radio unit, by establishing a new radio communication link between the first mobile radio unit and a temporary base station in the plurality of base stations, based on its associated signal strength value.

17. The apparatus as in claim 11, wherein the process when executed is further configured to:
start a timer for a keyhole time duration, after performing the handoff; and
force a second handoff from the second mobile radio unit to the first mobile radio unit, when the first mobile radio unit receives hello packets from a second destination base station with a higher signal strength value than that of the first destination base station and prior to expiration of the timer.

18. The apparatus as in claim 11, wherein the apparatus is located on a moving vehicle traveling along a pathway.

19. The apparatus as in claim 18, wherein the moving vehicle is a train and wherein the pathway comprises a railroad track.

20. A tangible, non-transitory, computer-readable medium storing program instructions that cause a mobile radio station in communication with a current base station of a plurality of base stations to execute a process comprising:
receiving, at the mobile radio station, hello packets from one or more base stations in the plurality of base stations, the mobile radio station receiving hello packets from the current base station on a first frequency via a first mobile radio unit and hello packets from one or more base stations in the plurality of base stations on a second frequency via a second mobile radio unit;
determining, based on the hello packets, signal strength values associated with each of the plurality of base stations; and
when the current base station is associated with a signal strength value that exceeds a threshold value:
selecting a first destination base station from the plurality of base stations based on the first destination base station having a highest signal strength value among those base stations in the plurality of base stations that sent hello packets to the second mobile radio unit on the second frequency, and
forcing a handoff from the first mobile radio unit to the second mobile radio unit, in part by establishing a new radio communication link between the second mobile radio unit and the first destination base station.

* * * * *

UNITED STATES PATENT AND TRADEMARK OFFICE
CERTIFICATE OF CORRECTION

PATENT NO. : 11,483,752 B2
APPLICATION NO. : 17/109808
DATED : October 25, 2022
INVENTOR(S) : Gaetano Catalli et al.

Page 1 of 1

It is certified that error appears in the above-identified patent and that said Letters Patent is hereby corrected as shown below:

In the Specification

Column 30, Line 16, please amend as shown:
$M_i$ is in radio communication link with the first base station Signed and Sealed this
Twenty-fourth Day of January, 2023

Katherine Kelly Vidal
*Director of the United States Patent and Trademark Office*